US012757200B2

(12) United States Patent
Chien

(10) Patent No.: US 12,757,200 B2
(45) Date of Patent: Oct. 6, 2026

(54) WIRELESS COMMUNICATION METHOD, USER EQUIPMENT, AND BASE STATION

(71) Applicant: PURPLEVINE INNOVATION COMPANY LIMITED, Hong Kong (HK)

(72) Inventor: Chun-Che Chien, Hong Kong (HK)

(73) Assignee: PURPLEVINE INNOVATION COMPANY LIMITED, Hong Kong (CN)

( * ) Notice: Subject to any disclaimer, the term of this patent is extended or adjusted under 35 U.S.C. 154(b) by 205 days.

(21) Appl. No.: 18/707,583

(22) PCT Filed: Nov. 4, 2022

(86) PCT No.: PCT/CN2022/129995
§ 371 (c)(1),
(2) Date: May 4, 2024

(87) PCT Pub. No.: WO2023/078418
PCT Pub. Date: May 11, 2023

(65) Prior Publication Data
US 2025/0008514 A1 Jan. 2, 2025

Related U.S. Application Data

(63) Continuation-in-part of application No. PCT/CN2022/084675, filed on Mar. 31, 2022, which
(Continued)

(30) Foreign Application Priority Data

Mar. 31, 2022 (WO) ................ PCT/CN2022/084674
Mar. 31, 2022 (WO) ................ PCT/CN2022/084675

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 1/1854* (2013.01);
(Continued)

(58) Field of Classification Search
None
See application file for complete search history.

(56) References Cited

U.S. PATENT DOCUMENTS 12,133,223 B2 * 10/2024 Wang ........................ H04L 1/00
2019/0074935 A1 3/2019 Babaei
(Continued)

FOREIGN PATENT DOCUMENTS

CN 102884844 A * 1/2013 ........... H04W 52/08
CN 103138896 A * 6/2013
(Continued)

OTHER PUBLICATIONS

3GPP TSG-RAN WG1 Meeting #106-e, Ericsson "HARQ-ACK Enhancements for IIoT/URLLC," Aug. 16-27, 2021, R1-2106678.*
(Continued)

*Primary Examiner* — Andrew C Oh
(74) *Attorney, Agent, or Firm* — PV IP PC; Wei Te Chung

(57) ABSTRACT

A user equipment (UE) executes a wireless communication method. The UE receives a physical uplink control channel (PUCCH) cell/carrier type information and receives a semi-persistent scheduling (SPS) physical downlink shared channel (PDSCH) at downlink slot/sub-slot location n. The SPS PDSCH is associated with a hybrid automatic repeat request (HARQ) feedback timing indicator K1 for indicating a transmission of a SPS HARQ-ACK bit responding to the SPS PDSCH on a PUCCH at a HARQ-ACK feedback slot/sub-slot location n+K1. The UE determines an adjusted HARQ-ACK feedback slot/sub-slot location n+K1_adj,
(Continued)

determines, based on the cell/carrier type information, a determined PUCCH cell/carrier for PUCCH transmission at the location n+K1_adj, and transmits the PUCCH on the determined PUCCH cell/carrier at the location n+K1_adj.

20 Claims, 13 Drawing Sheets

Related U.S. Application Data is a continuation-in-part of application No. PCT/CN2022/084674, filed on Mar. 31, 2022.

(60) Provisional application No. 63/275,503, filed on Nov. 4, 2021.

(51) Int. Cl.

| | |
|---|---|
| ***H04L 1/1829*** | (2023.01) |
| ***H04W 56/00*** | (2009.01) |
| ***H04W 72/0446*** | (2023.01) |
| ***H04W 72/11*** | (2023.01) |
| ***H04W 72/231*** | (2023.01) |
| ***H04W 72/232*** | (2023.01) |

(52) U.S. Cl.

CPC ....... *H04L 1/1861* (2013.01); *H04W 56/0015* (2013.01); *H04W 72/0446* (2013.01); *H04W 72/11* (2023.01); *H04W 72/231* (2023.01); *H04W 72/232* (2023.01)

(56) References Cited

U.S. PATENT DOCUMENTS

| | | | | |
|---|---|---|---|---|
| 2019/0222366 | A1* | 7/2019 | Zhang | H04L 1/1812 |
| 2020/0313809 | A1* | 10/2020 | Park | H04L 1/1861 |
| 2020/0374048 | A1* | 11/2020 | Lei | H04L 1/1854 |
| 2021/0021382 | A1 | 1/2021 | Chien | |
| 2021/0037516 | A1* | 2/2021 | Lyu | H04L 1/1864 |
| 2021/0100013 | A1* | 4/2021 | Khoshnevisan | H04L 1/0061 |
| 2021/0218504 | A1* | 7/2021 | Wang | H04L 1/1812 |
| 2021/0227570 | A1* | 7/2021 | Park | H04L 1/189 |
| 2021/0234640 | A1 | 7/2021 | Cirik et al. | |
| 2021/0320760 | A1* | 10/2021 | Rastegardoost | H04L 1/1854 |
| 2022/0086887 | A1* | 3/2022 | Elshafie | H04W 72/1273 |
| 2022/0094484 | A1* | 3/2022 | Babaei | H04W 72/1263 |
| 2022/0124783 | A1* | 4/2022 | Park | H04L 1/1812 |
| 2022/0132536 | A1* | 4/2022 | Yang | H04L 1/1812 |
| 2022/0217694 | A1* | 7/2022 | Kim | H04L 1/1864 |
| 2022/0225360 | A1* | 7/2022 | Yi | H04W 72/21 |
| 2022/0322398 | A1* | 10/2022 | Tsai | H04L 1/1854 |
| 2023/0028762 | A1* | 1/2023 | Choi | H04L 5/0094 |
| 2023/0284233 | A1* | 9/2023 | Tran | H04L 5/0044 370/329 |

FOREIGN PATENT DOCUMENTS

| | | | | | |
|---|---|---|---|---|---|
| CN | 104754742 | A | | 7/2015 | |
| CN | 109802771 | A | * | 5/2019 | H04L 1/1854 |
| CN | 112118627 | A | | 12/2020 | |
| CN | 112567802 | A | | 3/2021 | |
| CN | 112787787 | A | * | 5/2021 | H04L 5/0078 |
| CN | 112788747 | A | | 5/2021 | |
| CN | 112804033 | A | * | 5/2021 | H04L 5/0055 |
| CN | 113194534 | A | * | 7/2021 | H04L 1/1896 |
| CN | 113259064 | A | * | 8/2021 | H04W 72/23 |
| CN | 111193578 | B | * | 3/2022 | H04W 72/23 |
| CN | 114557076 | A | * | 5/2022 | H04W 72/23 |
| CN | 115150038 | A | * | 10/2022 | H04L 5/0078 |
| CN | 115174005 | A | * | 10/2022 | H04L 1/1812 |
| CN | 115175354 | A | * | 10/2022 | H04L 5/0055 |
| CN | 115918208 | A | * | 4/2023 | H04W 72/0446 |
| CN | 116325629 | A | * | 6/2023 | H04L 5/0078 |
| CN | 116724509 | A | * | 9/2023 | |
| CN | 117063422 | A | * | 11/2023 | H04L 1/1621 |
| EP | 4047853 | A1 | * | 8/2022 | H04L 5/0053 |
| KR | 20160110889 | A | * | 9/2016 | H04W 72/21 |
| TW | 202224464 | A | * | 6/2022 | H04L 1/1858 |
| WO | WO-2016144078 | A1 | * | 9/2016 | H04L 5/00 |
| WO | 2020069468 | A1 | | 4/2020 | |
| WO | WO-2020083074 | A1 | * | 4/2020 | H04L 1/18 |
| WO | WO-2020142985 | A1 | * | 7/2020 | H04L 1/18 |
| WO | WO-2020204526 | A1 | * | 10/2020 | H04W 72/23 |
| WO | 2021046833 | A1 | | 3/2021 | |
| WO | 2021088494 | A1 | | 5/2021 | |
| WO | 2021088800 | A1 | | 5/2021 | |
| WO | 2021146702 | A1 | | 7/2021 | |
| WO | WO-2021204241 | A1 | * | 10/2021 | H04L 1/1893 |
| WO | WO-2021228055 | A1 | * | 11/2021 | H04W 72/56 |
| WO | WO-2022027206 | A1 | * | 2/2022 | H04W 56/0045 |
| WO | WO-2022073486 | A1 | * | 4/2022 | H04L 1/1854 |
| WO | WO-2022076130 | A1 | * | 4/2022 | H04L 1/08 |
| WO | WO-2022081621 | A2 | * | 4/2022 | H04L 1/1861 |
| WO | WO-2022086888 | A1 | * | 4/2022 | H04L 5/001 |
| WO | WO-2022151162 | A1 | * | 7/2022 | H04W 72/04 |
| WO | WO-2022212387 | A1 | * | 10/2022 | H04L 1/1861 |

OTHER PUBLICATIONS

3GPP TSG-RAN WG1 Meeting #107-e, Nokia "Moderator summary #1 on HARQ-ACK feedback enhancements for NR Rel-17 URLLC/IIoT," Nov. 11-19, 2021, R1-21XXXXX.*

European Search Report in European application No. 22889439.0, mailed on Jun. 5, 2025.

NPL1: Huawei et al: "UE feedback enhancements for HARQ-ACK",3GPP Draft; R1-2106490, [retrieved on Aug. 7, 2021].

NPL2: Qualcomm Incorporated: "HARQ-ACK enhancement for IOT and URLLC", 3GPP Draft;R1-2110178, [retrieved on Oct. 2, 2021].

NPL3: ETRI:: "UE feedback enhancements for HARQ-ACK", 3GPP Draft;R1-2107472,[retrieved on Aug. 6, 2021].

International Search Report in International application No. PCT/CN2022/129994, mailed on Jan. 17, 2023.

Written Opinion of the International Search Authority in International application No. PCT/CN2022/129994, mailed on Jan. 17, 2023.

International Search Report in International application No. PCT/CN2022/084674, mailed on Jun. 28, 2022.

Written Opinion of the International Search Authority in International application No. PCT/CN2022/084674, mailed on Jun. 28, 2022.

International Search Report in International application No. PCT/CN2022/084675, mailed on May 30, 2022.

Written Opinion of the International Search Authority in International application No. PCT/CN2022/084675, mailed on May 30, 2022.

NTT Docomo, Inc. Summary on NR UE features for others "3GPP TSG RAN WG1 #103-e R1-2008545" Nov. 13, 2020 (Nov. 13, 2020).

Intel Corporation Discussion on prioritized UE HARQ feedback enhancements for URLLC/IIot "3GPP TSG RAN WG1 #103-e R1-2008984" Nov. 13, 2020(Nov. 13, 2020).

CMCC Discussion on DL SPS enhancements 3GPP TSF RAN WG1#99, R1-1912541 Nov. 22, 2019 (Nov. 22, 2019), section2.

Asia Pacific Telecom et. al. Discussion on UE feedback enhancements for HARQ-ACK 3GPP TSF-RAN WG1 Meeting #104-e, R1-2100968 Feb. 5, 2021 (Feb. 5, 2021).

Asia Pacific Telecom et. al. Discussion on UE feedback enhancements for HARQ-ACK 3GPP TSF-RAN WG1 #103-e. R1-2009053 Nov. 13, 2020 (Nov. 13, 2020), section 2.3.

Huawei et. al UE feedback enhancements for HARQ-ACK 3GPP TSG RAN WG1 Meeting #102-e, R1-2005243 Aug. 28, 2020 (Aug. 28, 2020) section 2.3.

Huawei et. al UE feedback enhancements for HARQ-ACK 3GPP TSG RAN WG1 Meeting #103-e, R1-2007565 Nov. 13, 2020 (Nov. 13, 2020) section 2.5.

(56) References Cited

OTHER PUBLICATIONS

International Search Report in International application No. PCT/CN2022/129995, mailed on Jan. 18, 2023.
Written Opinion of the International Search Authority in International application No. PCT/CN2022/129995, mailed on Jan. 18, 2023.

* cited by examiner

WIRELESS COMMUNICATION METHOD, USER EQUIPMENT, AND BASE STATION

CROSS REFERENCE TO RELATED APPLICATIONS

The disclosure is a US national phase application based upon an International Application No. PCT/CN2022/129995, filed on Nov. 4, 2022, titled "WIRELESS COMMUNICATION METHOD, USER EQUIPMENT, AND BASE STATION", which claims priority to International Application No. PCT/CN2022/084674, titled "WIRELESS COMMUNICATION METHOD, USER EQUIPMENT, AND BASE STATION", filed on Mar. 31, 2022, and International Application No. PCT/CN2022/084675, titled "WIRELESS COMMUNICATION METHOD, USER EQUIPMENT, AND BASE STATION", filed on Mar. 31, 2022, which claim priority to US provisional application filed on Nov. 4, 2021, which is incorporated by reference in the present application in its entirety.

TECHNICAL FIELD

The present disclosure relates to the field of communication systems, and more particularly, to a wireless communication method, a user equipment, and a base station.

BACKGROUND ART

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards being a broadband and mobile system. In cellular wireless communication systems, user equipment (UE) is connected by a wireless link to a radio access network (RAN). The RAN comprises a set of base stations (BSs) that provide wireless links to the UEs located in cells covered by the base station, and an interface to a core network (CN) which provides overall network control. As will be appreciated the RAN and CN each conduct respective functions in relation to the overall network. The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB.

Technical Problem

In order to meet the stringent requirements of ultra-reliable and low latency communication (URLLC), a fundamental issue needs to be addressed is to fulfill a reliable and prompt feedback of HARQ-ACK. Hence, an improvement in UE feedback for HARQ_ACK is necessary.

HARQ-ACK may comprise a HARQ-ACK information bit. According to 3GPP standard TS 38.213, a HARQ-ACK information bit value of 0 represents a negative acknowledgement (NACK) while a HARQ-ACK information bit value of 1 represents a positive acknowledgement (ACK). According to the UE procedure for reporting control information in TS 38.213, for a semi persistent scheduling (SPS) physical downlink shared channel (PDSCH) reception ending at slot n, the UE transmits a physical uplink control channel (PUCCH) carrying hybrid automatic repeat request (HARQ) acknowledgement (ACK) or non-acknowledgement (NACK) in slot n+K1. HARQ ACK or NACK is referred to as HARQ-ACK. SPS HARQ-ACK refers to HARQ-ACK for SPS traffic, such as SPS PDSCH. The timing indicator indicating the feedback timing offset K1 is provided by a PDSCH-to-HARQ_feedback timing indicator field in downlink control information (DCI) activating the SPS PDSCH reception or provided by a parameter dl-DataToUL-ACK. The timing indicator indicates one K1 value selected from K1 values in a configured K1 set. The DCI activating the SPS PDSCH reception may be referred to as activation DCI. However, if slot n+K1 is not an uplink (UL) slot, i.e., HARQ-ACK timing in the activation DCI collides with non-UL symbols given by semi-static time-division duplex (TDD) configuration, the UE will drop the PUCCH transmission carrying the HARQ-ACK. For example, in downlink (DL) heavy TDD configurations, when SPS periodicity is one slot, one fixed HARQ-ACK timing value K1 is not feasible to determine proper UL slots for every transmission of HARQ-ACKs for DL SPS PDSCH slots. Additionally, dropping HARQ-ACK can increase decoding workload at the UE and consume pre-configured PDSCH resource. Moreover, dropping HARQ-ACK and retransmitting the SPS PDSCH can cause system performance degradation in terms of latency and resource efficiency due to the necessity.

For current 3GPP standard, enhancement is needed if one or more PUCCH resources for HARQ-ACK responding SPS PDSCH without associated DCI collide with at least one of the following:

- DL symbols given by a semi-static TDD configuration; and
- Flexible symbols given by semi-static TDD configuration under some conditions, including:
  - a case where the UE is not configured to monitor slot format indicator (SFI);
  - a case where the UE is configured to monitor SFI, but no slot format is indicated for the slot carrying the PUCCH; or
  - a case where the UE is configured to monitor SFI and if a slot format indicates a set of symbols of the PUCCH as DL/flexible.

It is to be further studied how to avoid HARQ-ACK dropping for dynamically scheduled PDSCH or SPS PDSCH when HARQ-ACK feedback timing collides with invalid symbols for UL transmission. Hence, an enhanced wireless communication method is desired.

Technical Solution

An object of the present disclosure is to propose a wireless communication method, a user equipment, and a base station.

In a first aspect, an embodiment of the invention provides a wireless communication method executable in a user equipment (UE), comprising:

- receiving a physical uplink control channel (PUCCH) cell/carrier type information;
- receiving a semi-persistent scheduling (SPS) physical downlink shared channel (PDSCH) at downlink (DL) slot/sub-slot location n, where the SPS PDSCH is associated with a hybrid automatic repeat request (HARQ) feedback timing indicator K1 for indicating a transmission of a SPS HARQ-ACK bit responding to the received SPS PDSCH on a PUCCH at a HARQ-ACK feedback slot/sub-slot location n+K1;

determining an adjusted HARQ-ACK feedback slot/sub-slot location n+K1_adj;

determining, based on the received PUCCH cell/carrier type information, a first type cell/carrier or a second type cell/carrier as a determined PUCCH cell/carrier for PUCCH transmission at the adjusted slot/sub-slot location n+K1_adj; and transmitting the PUCCH on the determined PUCCH cell/carrier at the adjusted slot/sub-slot location n+K1_adj.

In a second aspect, an embodiment of the invention provides a user equipment (UE) comprising a processor configured to call and run a computer program stored in a memory, to cause a device in which the chip is installed to execute the disclosed method and any combination of embodiments of the disclosed method.

In a third aspect, an embodiment of the invention provides a wireless communication method executable in base station, comprising:

transmitting a physical uplink control channel (PUCCH) cell/carrier type information;

transmitting a semi-persistent scheduling (SPS) physical downlink shared channel (PDSCH) at downlink (DL) slot/sub-slot location n, the SPS PDSCH is associated with a hybrid automatic repeat request (HARQ) feedback timing indicator K1 for indicating a transmission of an SPS HARQ-ACK bit responding to the SPS PDSCH on a PUCCH at a HARQ-ACK feedback slot/sub-slot location n+K1;

determining an adjusted HARQ-ACK feedback slot/sub-slot location n+K1_adj;

determining a PUCCH cell/carrier for PUCCH receiving at the adjusted slot/sub-slot location n+K1_adj; and receiving the PUCCH on the determined PUCCH cell/carrier at the adjusted slot/sub-slot location n+K1_adj.

In a fourth aspect, an embodiment of the invention provides a base station comprising a processor configured to call and run a computer program stored in a memory, to cause a device in which the chip is installed to execute the disclosed method and any combination of embodiments of the disclosed method.

The disclosed method may be programmed as computer executable instructions stored in non-transitory computer readable medium. The non-transitory computer readable medium, when loaded to a computer, directs a processor of the computer to execute the disclosed method.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

The disclosed method may be programmed as a computer program product, that causes a computer to execute the disclosed method.

The disclosed method may be programmed as a computer program, that causes a computer to execute the disclosed method.

Advantageous Effects

Embodiments of the disclosure are provided to:

Reduce transmission latency of HARQ-ACK feedback.

Enhance resource utilization efficiency of PUCCH carrying HARQ-ACK.

Enhance HARQ-ACK feedback reliability due to interference avoidance or larger available resources.

DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field may obtain other figures according to these figures without paying the premise.

DETAILED DESCRIPTION OF EMBODIMENTS

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In the description, the terms cell and carrier are interchangeable used. For example, a target cell/carrier can be interpreted as a target cell or a target carrier. Similarly, a target cell can be interpreted as a target carrier, or a target carrier can be interpreted as a target cell. The slash mark "/" represent an OR relation.

In the description, the terms target cell and target PUCCH cell are interchangeable used. PUCCH stands for physical uplink control channel (PUCCH). For example, a target cell/carrier can be interpreted as a target PUCCH cell or a target PUCCH carrier. Similarly, target cell can be interpreted as a target PUCCH cell or a target PUCCH carrier. A target carrier can be interpreted as a target PUCCH carrier or a target PUCCH cell.

In the description, the terms PUCCH group, PUCCH cell group, PUCCH cell/carrier group, and cell group are interchangeable used.

In the description, the terms slot if not particularly specified can be interpreted as a slot, a sub-slot, a slot location, or a sub-slot location.

In the description, the terms switching if not particularly specified can be interpreted as PUCCH cell/carrier switching.

In the description, the terms pattern if not particularly specified can be interpreted as a time pattern for semi-static PUCCH cell/carrier switching that represents a sequence of switching between PUCCH cells/carriers. The time pattern for semi-static PUCCH cell/carrier switching can be renamed as:

PUCCH carrier switching pattern;
PUCCH carrier switching sequence
PUCCH switching sequence;
semi-static PUCCH cell/carrier switching pattern;
semi-static PUCCH cell/carrier time pattern;
semi-static timing switching pattern; or
semi-static time pattern configuration.

Each configuration in the time pattern for a PUCCH cell/carrier switching can be represented by a number or a bit, thus, to form a switching sequence.

Embodiments of the disclosure provides procedures and schemes to switch PUCCH transmissions, such as HARQ-ACK/NACK, to other PUCCH cells/carriers which do not collide with invalid symbols. In the disclosure, some embodiments address remaining issues of HARQ-ACK feedback deferral, such as HARQ-ACK deferral configurations and valid target slot/sub-slot determination. For PUCCH cell/carrier switching, some embodiments provide triggering conditions of dynamic PUCCH cell/carrier switching from an original cell to a target cell using a predefined rule or an indication in downlink control information (DCI), determination of the target cell for PUCCH cell/carrier switching, and PUCCH configurations of corresponding target cells.

Figure 1:
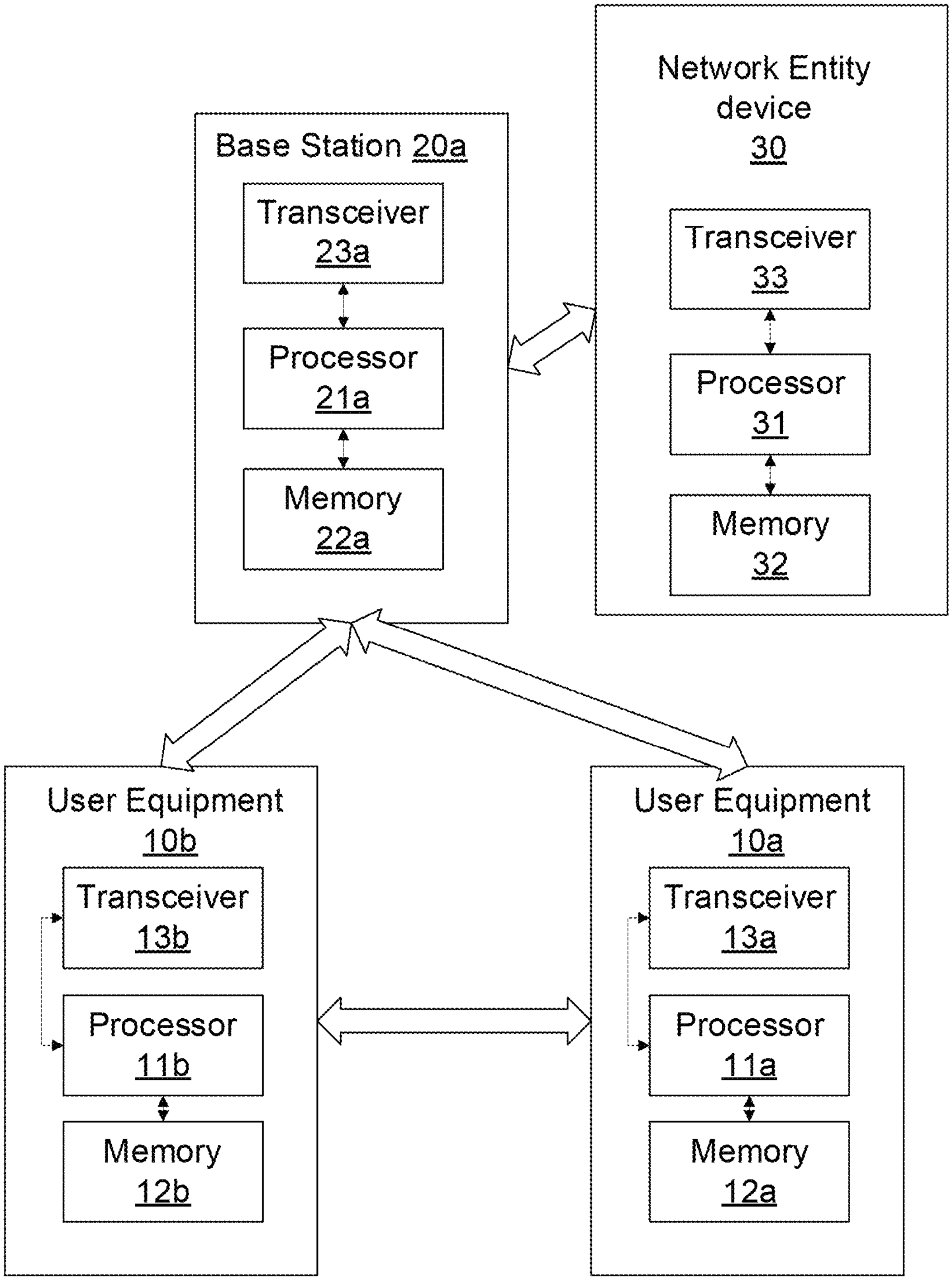
FIG. 1 illustrates a schematic view of a telecommunication system.

With reference to FIG. 1, a telecommunication system including a UE 10*a*, a UE 10*b*, a base station (BS) 20*a*, and a network entity device 30 executes the disclosed method according to an embodiment of the present disclosure. FIG. 1 is shown for illustrative not limiting, and the system may comprise more UEs, BSs, and CN entities. Connections between devices and device components are shown as lines and arrows in the FIGS. The UE 10*a* may include a processor 11*a*, a memory 12*a*, and a transceiver 13*a*. The UE 10*b* may include a processor 11*b*, a memory 12*b*, and a transceiver 13*b*. The base station 20*a* may include a processor 21*a*, a memory 22*a*, and a transceiver 23*a*. The network entity device 30 may include a processor 31, a memory 32, and a transceiver 33. Each of the processors 11*a*, 11*b*, 21*a*, and 31 may be configured to implement proposed functions, procedures and/or methods described in the description. Layers of radio interface protocol may be implemented in the processors 11*a*, 11*b*, 21*a*, and 31. Each of the memory 12*a*, 12*b*, 22*a*, and 32 operatively stores a variety of programs and information to operate a connected processor. Each of the transceivers 13*a*, 13*b*, 23*a*, and 33 is operatively coupled with a connected processor, transmits and/or receives radio signals or wireline signals. The UE 10*a* may be in communication with the UE 10*b* through a sidelink. The base station 20*a* may be an eNB, a gNB, or one of other types of radio nodes, and may configure radio resources for the UE 10*a* and UE 10*b*.

Each of the processors 11*a*, 11*b*, 21*a*, and 31 may include an application-specific integrated circuit (ASICs), other chipsets, logic circuits and/or data processing devices. Each of the memory 12*a*, 12*b*, 22*a*, and 32 may include read-only memory (ROM), a random access memory (RAM), a flash memory, a memory card, a storage medium and/or other storage devices. Each of the transceivers 13*a*, 13*b*, 23*a*, and 33 may include baseband circuitry and radio frequency (RF) circuitry to process radio frequency signals. When the embodiments are implemented in software, the techniques described herein may be implemented with modules, procedures, functions, entities, and so on, that perform the functions described herein. The modules may be stored in a memory and executed by the processors. The memory may be implemented within a processor or external to the processor, in which those may be communicatively coupled to the processor via various means are known in the art.

The network entity device 30 may be a node in a CN. CN may include LTE CN or 5G core (5GC) which includes user plane function (UPF), session management function (SMF), mobility management function (AMF), unified data management (UDM), policy control function (PCF), control plane (CP)/user plane (UP) separation (CUPS), authentication server (AUSF), network slice selection function (NSSF), and the network exposure function (NEF).

An example of the UE in the description may include one of the UE 10*a* or UE 10*b*. An example of the base station in the description may include the base station 20*a*. Uplink (UL) transmission of a control signal or data may be a transmission operation from a UE to a base station. Downlink (DL) transmission of a control signal or data may be a transmission operation from a base station to a UE. A DL control signal may comprise downlink control information (DCI) or a radio resource control (RRC) signal, from a base station to a UE.

The communication between UEs may be realized according to device to device (D2D) communication or vehicle-to-everything (V2X) communication. V2X communication includes vehicle-to-vehicle (V2V), vehicle-to-pedestrian (V2P), and vehicle-to-infrastructure/network (V2I/N) according to a sidelink technology developed under 3rd generation partnership project (3GPP) release 14, 15, 16, and beyond. UEs communicate with each other directly via a sidelink interface such as a PC5 interface. The disclosed method may be applied to a D2D or V2X communication. For sidelink based SPS traffic transmission on the Physical Sidelink Shared Channel (PSSCH), a transmitting side UE that sends SPS traffic scheduled by a gNB to a receiving side UE may operate similar operations as the gNB (e.g., gNB 20 in FIG. 2) in the description. The receiving side UE that receives the SPS traffic from the transmitting side UE may operate similar operations as the UE (e.g., UE 10 in FIG. 2) in the description. The receiving side UE performs HARQ feedback in response to sidelink SPS PSSCH transmission in Physical Sidelink Feedback Channel (PSFCH) based on the methods described in one or more embodiments.

Figure 2:
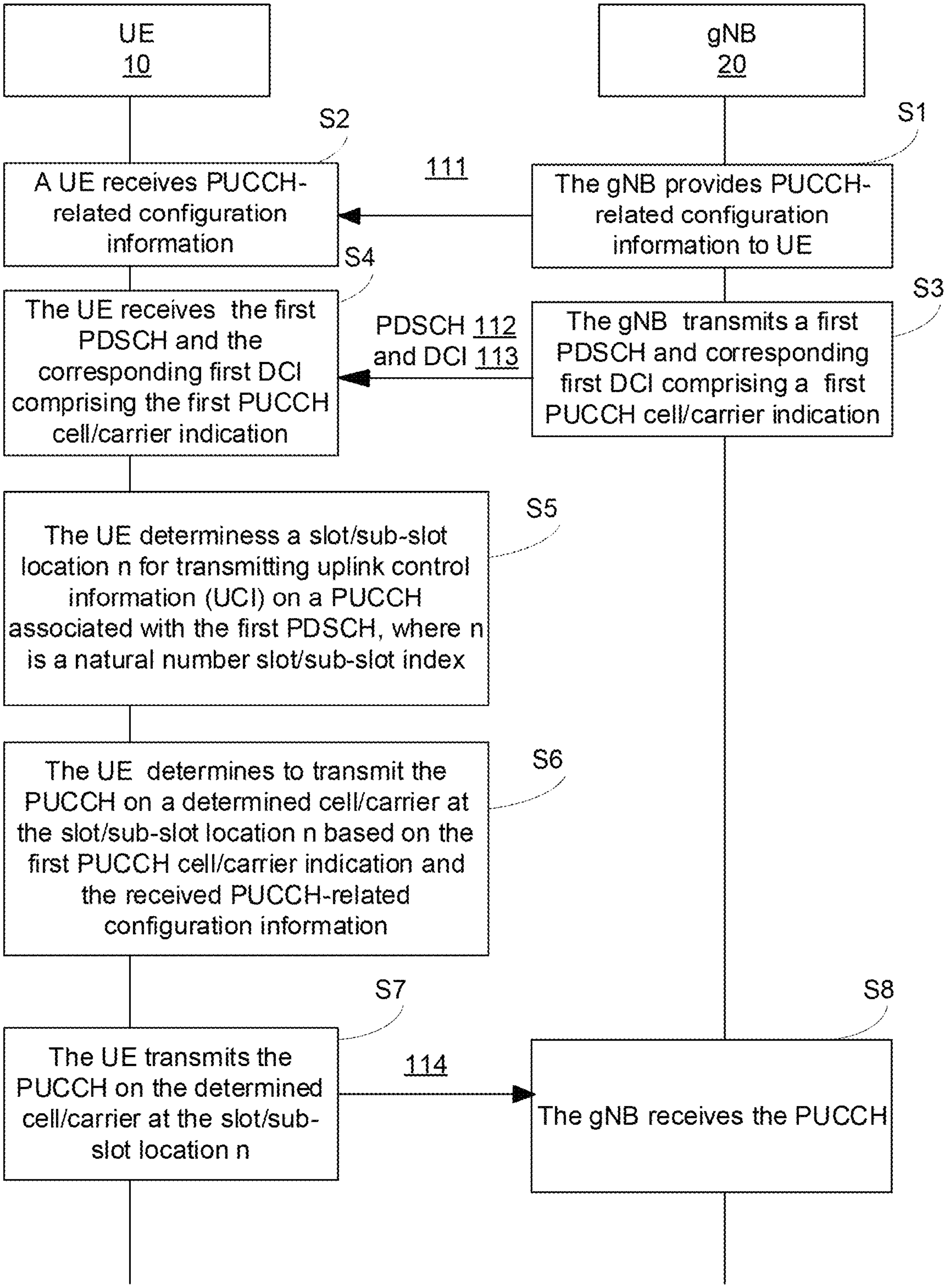
FIG. 2 illustrates a schematic view showing a wireless communication method according to an embodiment of the invention.

With reference to FIG. 2, a gNB 20 executes a wireless communication method. The gNB 20 may comprise an embodiment of the base station 20*a*. Note that although the gNB 20 is described as an example in the description, the wireless communication method may be executed by a base station, such as an eNB, a base station integrating an eNB and a gNB, or a base station for beyond 5G technologies. A UE 10 executes a wireless communication method. The UE 10 may comprise an embodiment of the UE 10*a* or UE 10*b*.

The gNB 20 provides PUCCH-related configuration information 111 to the UE 10 (S1), and the UE 10 receives PUCCH-related configuration information (S2).

The gNB 20 transmits to the UE 10 a first physical downlink shared channel (PDSCH) 112 and corresponding first downlink control information (DCI) 113 comprising a first PUCCH cell/carrier indication (S3). The UE 10 receives the first PDSCH 112 and the corresponding first DCI comprising the first PUCCH cell/carrier indication (S4).

The UE 10 determines a slot/sub-slot location n for transmitting uplink control information (UCI) on a PUCCH 114 associated with the first PDSCH 112, where n is a natural number slot/sub-slot index (S5).

The UE 10 determines to transmit the PUCCH 114 on a determined cell/carrier at the slot/sub-slot location n based on the first PUCCH cell/carrier indication and the received PUCCH-related configuration information 111, wherein the determined cell/carrier comprises a first type cell/carrier or at least one second type cell/carrier (S6).

The UE 10 transmits the PUCCH 114 on the determined cell/carrier at the slot/sub-slot location n (S7). The gNB 20 receives the PUCCH 114 (S8). The gNB 20 receives, on a cell/carrier at a slot/sub-slot location n, uplink control information (UCI) on PUCCH 114, where n is a natural number slot/sub-slot index. The cell/carrier is determined based on the first PUCCH cell/carrier indication and the received PUCCH-related configuration information. The determined cell/carrier comprises a first type cell/carrier or at least one second type cell/carrier.

Figure 3:
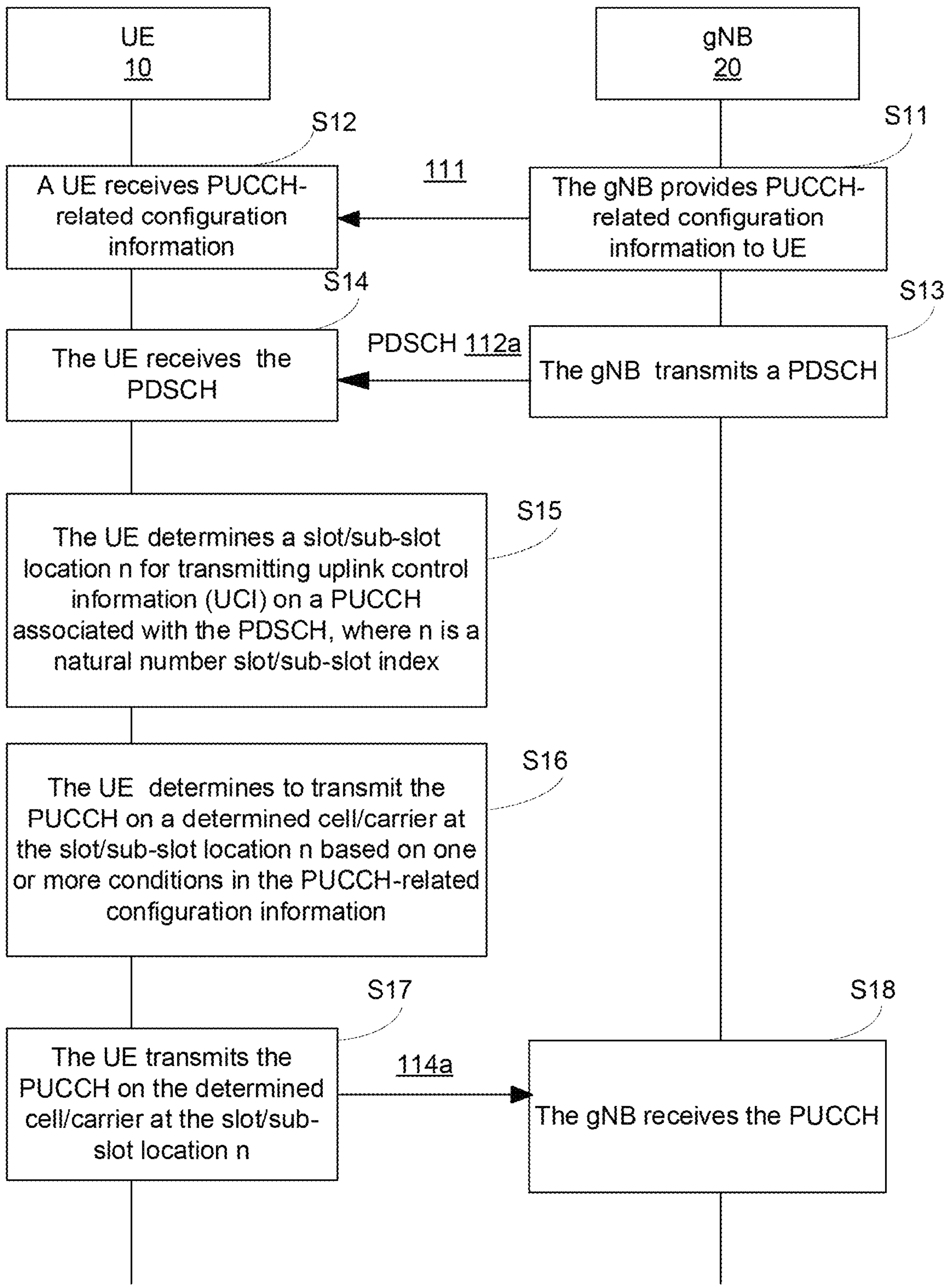
FIG. 3 illustrates a schematic view showing a wireless communication method according to another embodiment of the invention.

With reference to FIG. 3, in another embodiment, the gNB 20 provides PUCCH-related configuration information 111 to the UE 10 (S11), and the UE 10 receives PUCCH-related configuration information (S12).

The gNB 20 transmits to the UE 10 a first physical downlink shared channel (PDSCH) 112*a* (S13). The UE 10 receives the PDSCH 112*a* (S14).

The UE 10 determines a slot/sub-slot location n for transmitting uplink control information (UCI) on a PUCCH 114*a* associated with the PDSCH 112*a*, where n is a natural number slot/sub-slot index (S15).

The UE 10 determines to transmit the PUCCH 114*a* on a determined cell/carrier at the slot/sub-slot location n based on one or more conditions in the PUCCH-related configuration information 111, wherein the determined cell/carrier comprises a first type cell/carrier or at least one second type cell/carrier (S16).

The UE 10 transmits the PUCCH 114*a* on the determined cell/carrier at the slot/sub-slot location n (S17). The gNB 20 receives the PUCCH 114*a* (S18).

The gNB 20 receives, on a cell/carrier at a slot/sub-slot location n, uplink control information (UCI) on PUCCH 114*a*, where n is a natural number slot/sub-slot index. The cell/carrier is determined based on one or more conditions in the PUCCH-related configuration information and is associated with the slot/sub-slot location n. The determined cell/carrier comprises a first type cell/carrier or at least one second type cell/carrier.

Figure 13:
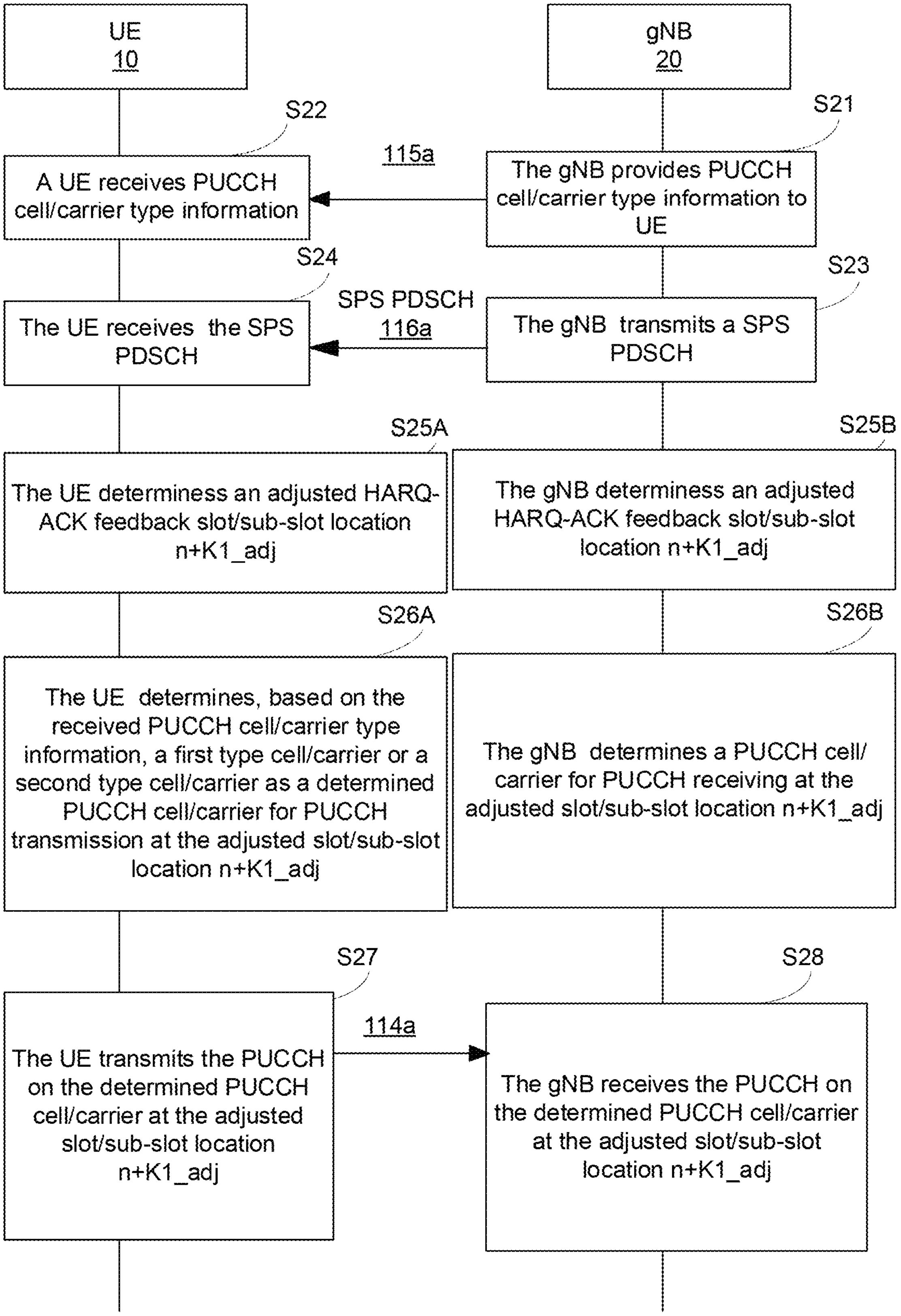
FIG. 13 illustrates a schematic view showing a wireless communication method according to still another embodiment of the invention.

With reference to FIG. 13, in another embodiment, the gNB 20 transmits a physical uplink control channel (PUCCH) cell/carrier type information 115*a* to the UE 10 (S21) and transmits a semi-persistent scheduling (SPS) physical downlink shared channel (PDSCH) 116*a* at downlink (DL) slot/sub-slot location n to UE 10, where the SPS PDSCH is associated with a hybrid automatic repeat request (HARQ) feedback timing indicator K1 for indicating a transmission of an SPS HARQ-ACK bit responding to the received SPS PDSCH on a PUCCH at a HARQ-ACK feedback slot/sub-slot location n+K1 (S23). The UE 10 receives the PUCCH cell/carrier type information 115*a* (S22) and receives the SPS PDSCH 116*a* at downlink (DL) slot/sub-slot location n (S24).

The UE 10 determines an adjusted HARQ-ACK feedback slot/sub-slot location n+K1_adj (S25A). The UE 10 determines, based on the received PUCCH cell/carrier type information 115*a*, a first type cell/carrier or a second type cell/carrier as a determined PUCCH cell/carrier for PUCCH transmission at the adjusted slot/sub-slot location n+K1_adj (S26A).

The gNB 20 determines an adjusted HARQ-ACK feedback slot/sub-slot location n+K1_adj (S25B) and determines a PUCCH cell/carrier for PUCCH receiving at the adjusted slot/sub-slot location n+K1_adj (S26B).

The UE 10 transmits the PUCCH on the determined PUCCH cell/carrier at the adjusted slot/sub-slot location n+K1_adj (S27). The gNB receives the PUCCH on the determined PUCCH cell/carrier at the adjusted slot/sub-slot location n+K1_adj (S28).

Figure 14:
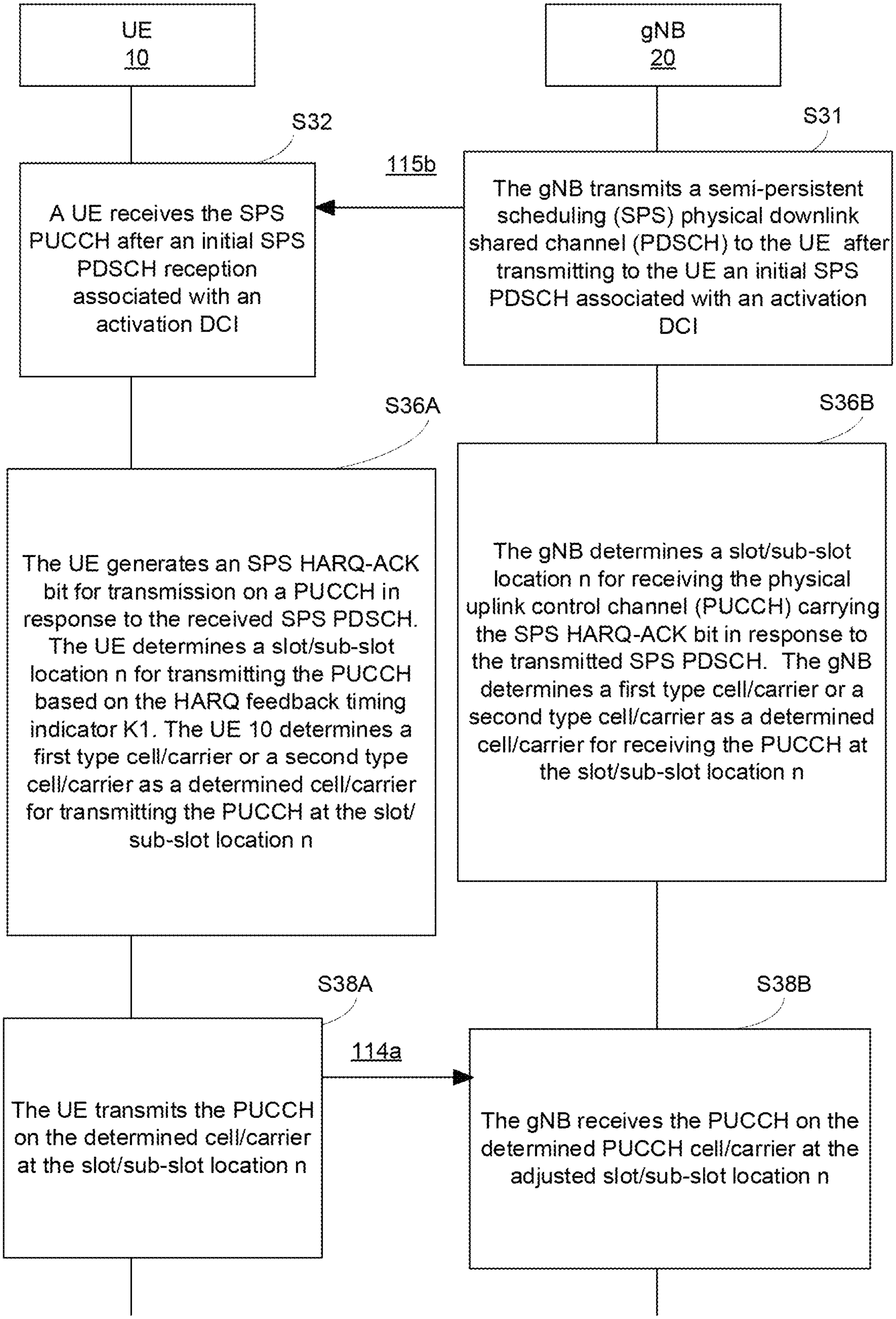
FIG. 14 illustrates a schematic view showing a wireless communication method according to further another embodiment of the invention.

With reference to FIG. 14, in another embodiment, the gNB 20 transmits a semi-persistent scheduling (SPS) physical downlink shared channel (PDSCH) 115*b* to the UE 10 after transmitting to the UE 10 an initial SPS PDSCH associated with an activation DCI (S31) wherein the SPS PDSCH is associated with a hybrid automatic repeat request (HARQ) feedback timing indicator K1. The UE 10 receives the SPS PDSCH 115*b* from the gNB 20 after an initial SPS PDSCH reception associated with an activation DCI (S32).

The UE 10 generates an SPS HARQ-ACK bit for transmission on a PUCCH in response to the received SPS PDSCH (S36A). The UE 10 determines a slot/sub-slot location n for transmitting the PUCCH based on the HARQ feedback timing indicator K1 (S36A). The UE 10 determines a first type cell/carrier or a second type cell/carrier as a determined cell/carrier for transmitting the PUCCH at the slot/sub-slot location n (S36A).

The gNB 20 determines a slot/sub-slot location n for receiving the physical uplink control channel (PUCCH) carrying the SPS HARQ-ACK bit in response to the transmitted SPS PDSCH (36B). The gNB 20 determines a first type cell/carrier or a second type cell/carrier as a determined cell/carrier for receiving the PUCCH at the slot/sub-slot location n (S36B).

The UE 10 transmits the PUCCH on the determined cell/carrier at the slot/sub-slot location n (S38A). The gNB 20 receives the PUCCH on the determined cell/carrier at the slot/sub-slot location n (S38B).

In the following description, unless elsewhere specified, a UE can be interpreted as an embodiment of the UE 10, and a gNB or a base station can be interpreted as an embodiment of the gNB 20.

Embodiment A1

An embodiment of the disclosed method performs valid target slot or sub-slot determination for SPS HARQ-ACK deferring (i.e., postponing SPS HARQ-ACK).

Embodiment A1-1

The target slot or sub-slot indicated by K1_adj can be determined as a valid slot or sub-slot for the transmission of deferred SPS HARQ-ACK (i.e., postponed SPS HARQ-ACK) if at least one of the following conditions is met:

- All symbols in the target slot or sub-slot used for transmission of deferred SPS HARQ-ACK are valid. For example, the one or more symbols in the slot or sub-slot location of n+K1_adj for transmission of the one or more HARQ-ACK bits in the HARQ-ACK codebook are one or more valid symbols not colliding with semi-static DL symbols, synchronization signal and PBCH blocks (SSBs), or control resource set zero (CORESET #0). The one or more symbols in the slot or sub-slot location of n+K1_adj for transmission of the one or more HARQ-ACK bits in the HARQ-ACK codebook are located in a PUCCH resource.
  - The semi-static DL symbols may be configured in RRC signaling. PBCH stands for physical broadcast channel. The one or more valid symbols not colliding with semi-static DL symbols, SSB or CORESET #0 may be located in a PUCCH resource.
- At least one of the following PUCCH resources is configured and is available within the valid symbols of the target slot or sub-slot:
  - An SPS PUCCH resource, e.g., in sps-PUCCH-AN-List-r16 or n1PUCCH-AN;
  - A dynamic PUCCH resource, e.g., in PUCCH-ResourceSet;
  - A channel state information (CSI) PUCCH resource, e.g., in multi-CSI-PUCCH-ResourceList; and/or
  - An additional set of newly created SPS PUCCH resource, other than existing SPS PUCCH resource, e.g., SPS-PUCCH-AN-List-r16 or n1 PUCCH-AN.

To be more specific, the location of the PUCCH resource in the target slot or sub-slot for deferred SPS HARQ-ACK transmission can be configured by RRC signaling using RRC parameters such as sps-PUCCH-AN-List-r16 or n1PUCCH-AN, or indicated by DCI using a PUCCH resource index associated with a PUCCH resource in an RRC configured PUCCH-ResourceSet.

With reference to FIG. 13, according to embodiment A1-1, the adjusted HARQ-ACK feedback slot/sub-slot location K1_adj comprises an offset K1_offset value with respect to K1, and the adjusted slot/sub-slot location n+K1_adj is a slot/sub-slot location n+K1+K1_offset, wherein at least one of the K1_adj or K1_offset is limited by a maximum offset value, and the maximum offset value is configured via radio resource control (RRC) signaling.

Embodiment A1-4

The UE 10 may determine a valid slot or sub-slot for deferred SPS HARQ-ACK transmission based on a maximum number of slots or sub-slots for deferral (i.e., a maximum value of K1_offset) from the initial slot or sub-slot determined by n+K1 in the activation DCI or dl-DataToUL-ACK in RRC configuration to the target slot or sub-slot determined by n+K1+K1_offset. The maximum number of slot or sub-slot for deferral serves as an upper limit or a threshold for a number of slots or sub-slots for deferral. The maximum value of K1_offset serves as an upper limit or a threshold for K1_offset. The UE 10 can determine the target slot or sub-slot for deferred HARQ-ACK transmission which does not exceed the maximum number of slot or sub-slot for deferral (i.e., the maximum value of K1_offset). In another embodiment, the maximum number of slots or sub-slots for deferral can also be defined as the maximum value of K1_adj (i.e., K1+K1_offset), which indicates the maximum value of deferred HARQ-ACK feedback offset with respect to the received SPS PDSCH at slot or sub-slot n.

The maximum number of slot or sub-slot for deferred SPS HARQ-ACK transmission may be configured by the gNB 20 and is determined based on the latency requirements of HARQ-ACK feedback for specific SPS traffic and indicated to the UE 10 in a downlink control signal. The maximum number of slot or sub-slot for deferred SPS HARQ-ACK transmission may be referred to as maximum deferral time. Deferred HARQ-ACK transmission for SPS traffic may be referred to as SPS HARQ-ACK deferral. The maximum deferral time can be the same among all SPS configurations or independently configured per SPS configuration. The maximum value of the K1_adj or the maximum value K1_offset is configured per SPS configuration via RRC signaling. The maximum value of K1_adj serves as an upper limit or a threshold for K1_adj.

Embodiment A3

The UCI includes a scheduling request (SR) initialized by the UE or information of hybrid automatic repeat request acknowledgement or negative acknowledgement feedback (HARQ ACK/NACK) responding to the received PDSCH.

In the scenario of CA (carrier aggregation) and/or SUL (supplementary UL), for dynamic switching of PUCCH cell/carrier carrying HARQ-ACK and/or SR (scheduling request) based on a predetermined rule or indicated by gNB, the triggering condition of PUCCH cell/carrier switching from an original cell to a target cell includes one or more of the following:

- Triggering conditions of PUCCH cell/carrier switching for SPS HARQ-ACK includes:
  - the PUCCH transmission at the slot/sub-slot determined by K1 in the activation DCI or dl-DataToUL-ACK in RRC configuration of the original cell is invalid, e.g., collides with semi-static DL symbol(s), flexible symbol(s) indicated for DL transmission by SFI, SSB or CORESET #0, and the slot/sub-slot of the target cell determined by the same value of K1 has valid symbols for uplink transmission.
- Triggering conditions of PUCCH cell/carrier switching for dynamic HARQ-ACK (i.e., HARQ-ACK feedback for dynamic PDSCH scheduling) includes:
  - the PUCCH transmission at the slot/sub-slot determined by K1 in the DCI for scheduled PDSCH of the original cell is invalid, e.g., collides with semi-static DL symbol(s), flexible symbol(s) indicated for DL transmission by SFI, SSB or CORESET #0, and the slot/sub-slot of the target cell determined by the same value of K1 has valid symbols for uplink transmission.
- Triggering conditions of PUCCH cell/carrier switching for SR includes:
  - the PUCCH transmission at the slot/sub-slot determined by SR parameters, e.g., SR period, in the RRC configuration of the original cell is invalid, e.g., collides with semi-static DL symbol(s), flexible symbol(s) indicated for DL transmission by SFI, SSB or CORESET #0, and the slot/sub-slot of the target cell determined by the same SR parameters has valid symbols for uplink transmission.

Triggering conditions of PUCCH cell/carrier switching for HARQ-ACK and SR includes:

SR is scheduled to be jointly transmitted with HARQ-ACK in a PUCCH of the original cell using a certain PUCCH format; However, the scheduled slot/sub-slot for joint SR and HARQ-ACK transmission is invalid, the and the corresponding slot/sub-slot of the target cell has valid symbols for uplink transmission.

Above trigger conditions for triggering PUCCH cell/carrier switching can also be valid even if there are no valid symbols for uplink transmission in other PUCCH cells at the transmission time of the original slot/sub-slot of HARQ-ACK/SR transmission on the original cell while one of the other PUCCH cells has earlier valid slot/sub-slot than an original slot/sub-slot for deferred HARQ-ACK/SR transmission.

Embodiment A4: Scenario of Carrier Aggregation (CA) and/or Supplementary UL (SUL)

In the scenario of carrier aggregation (CA) and/or supplementary UL (SUL), the UE can be configured to activate/deactivate PUCCH cell/carrier switching based on one or more of UE capability and an indication from the gNB, which are detailed in the following.

Activate/deactivate PUCCH cell/carrier switching based on UE capability:

For example, a UE with a UE capability with more activated carriers and fewer switching time can support PUCCH cell/carrier switch.

Activate/deactivate PUCCH cell/carrier switching based on an indication from the gNB:

The gNB can indicate to the UE whether PUCCH cell/carrier switching is activated or not using a new or existing indication via an RRC signal, medium access control (MAC) signal, or DCI.

For example, the gNB can use a bitmap via MAC signaling to indicate to the UE a set of SCells capable of PUCCH cell/carrier switching.

For example, the gNB can notify UE of whether PUCCH cell/carrier switching is applicable or not in terms of one or more serving cell/carrier index for one or more PUCCH cell/carriers based on a newly added parameter in RRC signaling or dynamic DCI.

For example, the gNB can notify the UE of whether PUCCH cell/carrier switching is applicable or not for one or more PUCCH cell/carriers based on existing serving cell relevant RRC configuration (e.g., ServingCellConfig). In an embodiment, the gNB configures ServingCellConfig to indicate to the UE whether PUCCH cell/carrier switching is activated for each newly added SCell.

Embodiment A5: Slot/Sub-Slot Location

In the scenario of CA and/or SUL. For a UE, if subcarrier spacing (SCS) of an original cell/carrier before PUCCH cell/carrier switching and SCS of a target cell/carrier after PUCCH cell/carrier switching is not the same, a location of a slot/sub-slot (referred to as a slot/sub-slot location) for PUCCH transmission on the target cell can be determined based on one or more of the following schemes.

Scheme 1: The UE uses a K1 value with respect to the SCS of the original cell to derive a slot/sub-slot location, which then map to an equivalent slot/sub-slot location of the target cell for PUCCH transmission.

Scheme 2: The UE uses a K1 value with respect to the SCS of the target cell to derive the slot/sub-slot location on the target cell for PUCCH transmission.

Scheme 3: The UE uses a K1 value with respect to the maximum or minimum value of SCS compared between the original cell and the target cell to determine the slot/sub-slot location on the target cell for PUCCH transmission.

Scheme 4: The UE relies on an indication via RRC signaling or DCI from the gNB to determine the SCS adopted for calculating a K1 value.

Scheme 5: The UE uses a K1 value with respect to a reference SCS defined by the standard to derive the slot/sub-slot location on the target cell for PUCCH transmission.

Embodiment A6

In the scenario of CA and/or SUL, for dynamic switching of the PUCCH cell/carrier carrying HARQ-ACK and/or SR based on a predetermined rule or indicated by gNB, if more than one PUCCH cells have valid symbols for PUCCH transmission in a PUCCH cell group, the UE may select a target cell based on one or more of the following schemes:

Scheme 1: Based on a cell index or priority levels of PUCCH cells configured by gNB via RRC signaling:

For example, according to priority levels of PUCCH cells configured by gNB, an order of target cell selection is PCell first, followed by a SCell with the smallest cell index.

For example, in addition to PCell, which is always the top priority, a PUCCH cell with the highest priority is selected as the target cell.

Scheme 2: Based on the SCS of PUCCH cells:

For example, among the PUCCH cell candidates, a PUCCH cell having the same or similar SCS as the original cell (e.g., PCell) is selected as the target cell;

For example, the UE selects a cell with corresponding SCS, which has the earliest available valid resource for PUCCH transmission, as the target cell.

For example, among the PUCCH cell candidates, a PUCCH cell having the maximum or minimum SCS among the PUCCH cells is selected as the target cell.

Scheme 3: Based on the DL/UL ratio of TDD configuration of PUCCH cells:

For example, the PUCCH cell with UL-heavy patterns, i.e., more UL slots than DL slots in a periodicity of a TDD configuration, is selected as a target cell.

Scheme 4: Based on the availability of PUCCH resource(s):

The UE may rely on the PRI in the DCI and the accumulated HARQ-ACK bit size to derive the required PUCCH resource for HARQ-ACK codebook construction.

For example, only a PUCCH cell with a PUCCH resource capable of supporting HARQ-ACK codebook size larger than the number of HARQ-ACK bits being switched from the original cell to the target cell or larger than the number of accumulated HARQ-ACK bits, including the HARQ-ACK bits being switched from the original cell to the target cell and the HARQ-ACK bits originally scheduled on the target cell, is selected as the target cell.

For example, a PUCCH cell having the earliest valid PUCCH resource for HARQ-ACK transmission is selected as the target cell.

Some of the PUCCH resources can be defined specially for the purpose of carrying HARQ-ACK feedbacks on the PUCCH cell supporting PUCCH cell switching. And only the PUCCH cell with such a kind of PUCCH resource can be selected as the target cell.

Scheme 5: Based on the feature of HARQ-ACK codebook:

For example, only a cell having a codebook configuration with a high priority level or low priority level is selected as target cell.

For example, only a cell having a codebook configuration with a special codebook type (e.g., type1, type 2, type3 codebook, or newly defined codebook type for HARQ-ACK retransmission in Rel. 17) is selected as the target cell.

Figure 4:
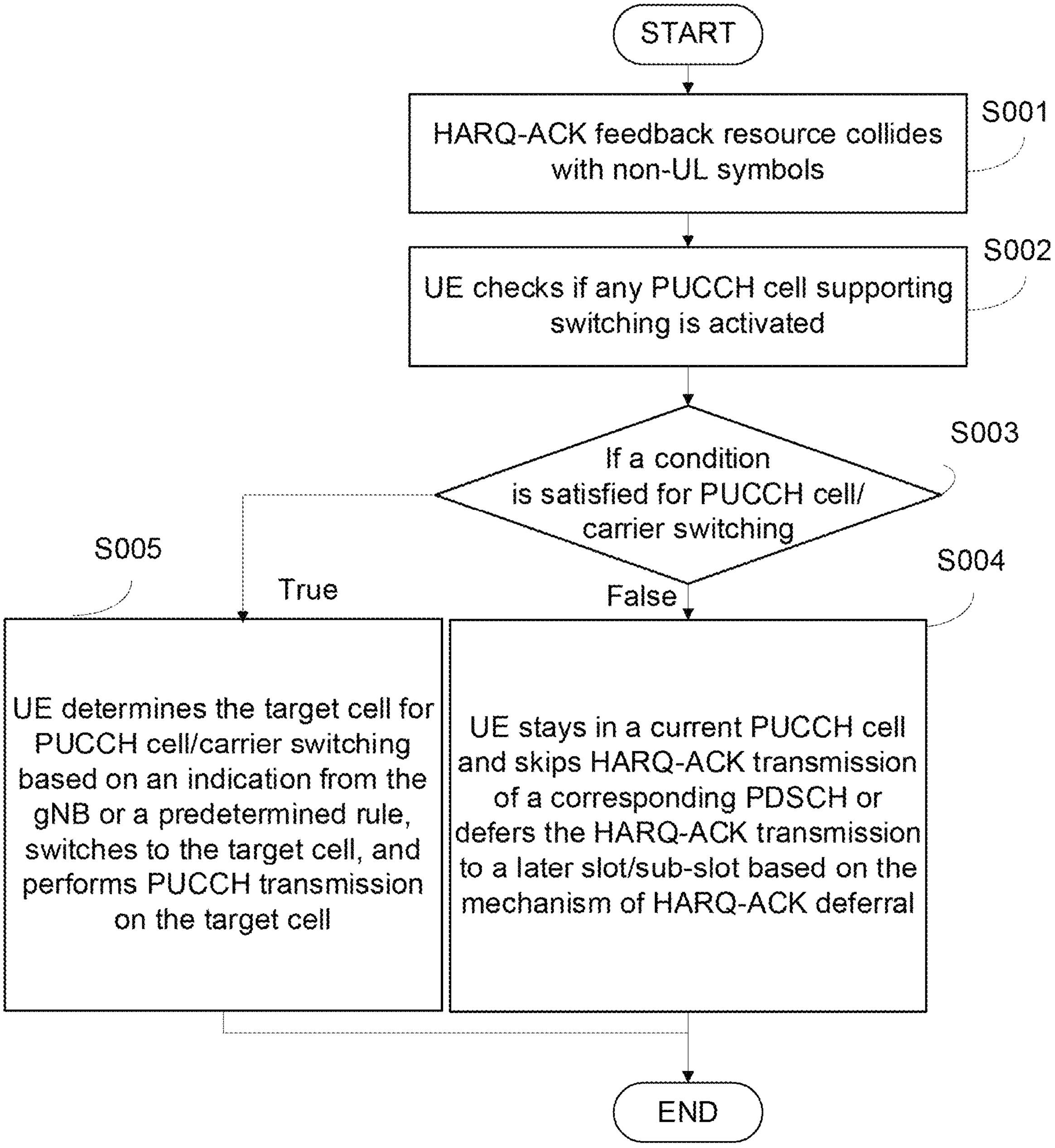
FIG. 4 illustrates a schematic view showing an example of a PUCCH cell/carrier switching procedure.

Embodiment A7: An Example of a Procedure for Performing PUCCH Cell/Carrier Switching With reference to FIG. 4, in an embodiment, the UE 10 performs an example of a procedure of PUCCH cell/carrier switching.

The HARQ-ACK feedback resource (i.e., a radio resource for HARQ-ACK) of a corresponding SPS PDSCH or a dynamically scheduled PDSCH with respect to the indicated K1 value collides with non-valid symbols (i.e., non-UL symbols) in the PCell (S001).

When HARQ-ACK feedback resource (i.e., a radio resource for HARQ-ACK) of the corresponding SPS PDSCH or the scheduled PDSCH with respect to the indicated K1 value collides with non-valid symbols in the PCell based on a serving cell configuration, the UE determines whether any other PUCCH cell(s) supports PUCCH cell/carrier switching has been activated (S002).

When one or more PUCCH cells support PUCCH cell/carrier switching, the UE determines whether a condition for triggering of PUCCH cell/carrier switching for transmission of SPS HARQ-ACK responding received SPS PDSCH or HARQ-ACK responding dynamically scheduled PDSCH has been met (S003).

When the condition cannot be satisfied, the UE stays in a current PUCCH cell and skips HARQ-ACK transmission of a corresponding PDSCH or defers the HARQ-ACK transmission to a later slot/sub-slot based on the mechanism of HARQ-ACK deferral (S004).

When the condition is satisfied, the UE determines the target cell for PUCCH cell/carrier switching based on an indication from the gNB or a predetermined rule, switches to the target cell, and performs PUCCH transmission on the target cell (S005).

In an embodiment, the PDSCH is without a PUCCH cell/carrier indication in corresponding downlink control information (DCI).

Embodiment A8

For switching of the PUCCH cell/carrier carrying HARQ-ACK and/or SR using a predetermined rule or indicated by gNB, the gNB can configure a set of cells as a PUCCH group for performing PUCCH cell/carrier switching based on one or more of the following features or settings.

At least one cell group for PUCCH cell/carrier switching includes PCell

When PCell is included in a cell group, PCell is set as the default cell or the original cell for PUCCH transmission.

The gNB determines a set of cells for performing PUCCH cell/carrier switching based on the slot format of TDD configuration on each cell.

For example, cells with TDD configurations having non-overlapped UL slot/sub-slot in the time domain can be selected to form a PUCCH group.

The gNB can configure in a PUCCH cell supporting PUCCH cell/carrier switching within a PUCCH group, one or more PUCCH resources which is specific for HARQ-ACK and/or SR transmission upon switching to the PUCCH cell supporting PUCCH cell/carrier switching. The specific PUCCH resource configured for the PUCCH cell supporting PUCCH cell/carrier switching can be separated from a PUCCH resource configured for the PUCCH cell not supporting PUCCH cell/carrier switching.

The gNB can configure in the PUCCH cell supporting PUCCH cell/carrier switching within a PUCCH group, a codebook type which is specific for HARQ-ACK and/or SR transmission upon switching to the PUCCH cell supporting PUCCH cell/carrier switching.

With reference to FIG. 2 and according to embodiment A8, the at least one PUCCH resource configured for the at least one second type cell/carrier supporting PUCCH cell/carrier switching is separated from a PUCCH resource configured for the at least one second type cell/carrier not supporting PUCCH cell/carrier switching.

With reference to FIG. 2 and according to embodiment A8, the first type cell/carrier is one of primary cell (PCell), primary secondary cell (PScell), or PUCCH-SCell in the PUCCH group, and the at least one second type cell/carrier is one of SCells within the same PUCCH group of the first type cell/carrier, one or more PUCCH groups supporting PUCCH cell/carrier switching is configured for the UE.

With reference to FIG. 2 and according to embodiments A6 and A8, a supported priority level for a HARQ-ACK codebook or a supported codebook type of the HARQ-ACK codebook for the at least one second type cell/carrier supporting PUCCH cell/carrier switching is configured for the UE.

With reference to FIG. 3, according to embodiments A8, the at least one of PUCCH resource configured for the at least one second type cell/carrier supporting PUCCH cell/carrier switching is separated from a PUCCH resource configured for the at least one second type cell/carrier not supporting PUCCH cell/carrier switching.

With reference to FIG. 3, according to embodiments A8, the first type cell/carrier is one of primary cell (PCell), primary secondary cell (PScell), or PUCCH-SCell in the PUCCH group, and the at least one second type cell/carrier is one of SCells within the same PUCCH group of the first type cell/carrier, one or more than one PUCCH group supporting PUCCH cell/carrier switching is configured for the UE.

With reference to FIG. 3, according to embodiments A8, a supported priority level of a HARQ-ACK codebook or a supported codebook type of the HARQ-ACK codebook for the at least one second type cell/carrier supporting PUCCH cell/carrier switching is configured for the UE.

Embodiment A9

Switching of the PUCCH cell/carrier carrying HARQ-ACK and/or SR may be triggered based on a predetermined rule or an indication indicated by gNB. A priority order for PUCCH cell/carrier switching within a PUCCH group at a particular slot/sub-slot can be configured by a gNB, such as the gNB 20.

If the UE are allocated multiple PUCCH cells whose symbols are valid for PUCCH transmission, a priority order of PUCCH cells is defined as the selection order for the UE. The UE selects one of the PUCCH cells within a PUCCH group at a particular slot/sub-slot scheduled for transmission of HARQ-ACK and/or SR according to the selection order. The priority order is an arrangement of the PUCCH cells according to priority levels of the PUCCH cells, where each PUCCH cell has a priority level.

A priority level of a PUCCH cell can be configured by a gNB, such as the gNB 20, via RRC signaling.

Priority level can be set differently for different slot/sub-slot of a PUCCH cell.

PCell is by default the top priority cell within a PUCCH group.

Embodiment A10: Switching of the PUCCH Cell/Carrier Carrying HARQ-ACK and/or SR The UCI transmitted on the PUSCH may include a scheduling request (SR) initialized by the UE or information of hybrid automatic repeat request acknowledgement or negative acknowledgement feedback (HARQ ACK/NACK) responding the received first PDSCH.

The PUCCH cell/carrier carrying HARQ-ACK and/or SR may be dynamically switched based on a predetermined rule. The gNB may configure a sequential order for PUCCH cell/carrier switching within a PUCCH group for one or more slots/sub-slots.

A sequential order for PUCCH cell/carrier switching between PUCCH cells in the PUCCH group is defined as a set of sequence of PUCCH cell/carrier switching (referred to as a PUCCH cell/carrier switching sequence or a PUCCH cell/carrier switching pattern) for a set of upcoming slots/sub-slots scheduled for PUCCH transmission.

The PUCCH cell/carrier switching sequence can be represented by a switching sequence using a bitmap. The gNB can construct a bitmap table with row indexes, and each row index maps to a switching sequence forming a bitmap. The bitmap table serves as a lookup table. The gNB provides one of the row indexes by via RRC configuration or DCI to indicate which PUCCH cell/carrier switching pattern should be applied for following slots/sub-slots scheduled for PUCCH transmission.

For example, for HARQ-ACK feedback, a DCI can indicate to the UE a PUCCH cell/carrier switching pattern of each feedback slot with a row index of the table. The feedback slot is a slot for HARQ-ACK feedback. For example, bit 0 represents using PCell for HARQ-ACK feedback, and bit 1 represents using another PUCCH cell for HARQ-ACK feedback.

A cell index of another PUCCH cell can be configured by the gNB and shared to the UE in advance.

A numerical value in the PUCCH switching sequence can be extended to more than 1 bit to select one PUCCH cell among two or more PUCCH cell candidates for a slot/sub-slot.

With reference to FIG. 2 and according to embodiment A10, the UE determines to transmit the PUCCH on the at least one second type cell/carrier at slot/sub-slot location n if at least one bit of the first PUCCH cell/carrier indication is other than zero.

With reference to FIG. 2 and according to embodiment A10, the UE determines to transmit the PUCCH on the first type cell/carrier at the slot/sub-slot location n if each bit of the first PUCCH cell/carrier indication is zero.

With reference to FIG. 3, the UE determines to transmit the PUCCH on the first type cell/carrier if at least one of the following conditions in the received PUCCH-related configuration information is satisfied:

- in addition to the first type cell/carrier, the at least one second type cell/carrier supporting PUCCH cell/carrier switching within a PUCCH group is not activated;
- an UL BWP of the at least one second type cell/carrier supporting PUCCH cell/carrier switching within the PUCCH group is not activated;
- a set of switching sequence indicating an order of PUCCH cell/carrier switching among the first type cell/carrier and the at least one second type cell/carrier at slot/sub-slot granularity within the PUCCH group for one or more than one slot/sub-slot is not configured; and
- the set of switching sequence is configured and a numerical indication of a cell/carrier for transmission of the PUCCH on the slot/sub-slot location n is zero.

With reference to FIG. 3, according to embodiment A10, the set of switching sequence can be indicated using a bitmap table with a row index configured for the UE, and each row index of the bitmap table indicates to one of a plurality sets of switching sequence.

With reference to FIG. 13, according to embodiment A10, the bit indication is zero if the PUCCH cell/carrier for transmitting the PUCCH at slot/sub-slot location n+K1_adj is the first type cell/carrier. The PUCCH cell/carrier type indication comprises a bit indication, and the bit indication is zero if the PUCCH cell/carrier for transmitting the PUCCH at slot/sub-slot location n+K1_adj is the first carrier type.

Embodiment A11

PUCCH resource(s) used for PUCCH cell/carrier switching in each PUCCH cell/carrier within a PUCCH group can be individually configured or jointly configured.

The gNB can configure a set of PUCCH resources and apply the configured set of PUCCH resources to each PUCCH cell/carrier within a PUCCH group.

The gNB can configure a particular set of PUCCH resources specific for PUCCH transmission upon switching to the PUCCH cell/carrier that supports PUCCH cell/carrier switching.

Embodiment A12

A gNB (e.g., gNB 20) can configure different sets of PUCCH cell candidates for different slot/sub-slot locations.

If multiple PUCCH cell candidates are configured for each slot/sub-slot, and different sets of PUCCH cell candidates can be applied to different slot/sub-slot locations, the UE chooses one PUCCH cell among a set of PUCCH cell candidates with respect to a slot/sub-slot for HARQ-ACK feedback (referred to as feedback slot/sub-slot) based on a predetermined rule or an indication from the gNB in DCI.

If each feedback slot is associated with only one PUCCH cell candidate, the UE follows gNB's indication to switch PUCCH cell at different feedback slots, and each of the different feedback slots may not corresponds to the same PUCCH cell.

Embodiment A13-1

For switching of the PUCCH cell/carrier carrying HARQ-ACK and/or SR, the HARQ-ACK and/or SR not being multiplexed with any HARQ-ACKs and/or SR of the target cell can be carried in at least one of following PUCCH resources configured for the target cell:

SPS-PUCCH-AN-List-r16 or n1PUCCH-AN configured for SPS PDSCH; and

PUCCH-ResourceSet configured for scheduled PDSCH.

Embodiment A13-2

For switching of the PUCCH cell/carrier carrying HARQ-ACK and/or SR, the HARQ-ACK and/or SR and the scheduled HARQ-ACK and/or SR for the target cell can be transmitted jointly on the target cell with the same codebook using at least one of following PUCCH resource configured for the target cell. The scheduled HARQ-ACK and/or SR for the target cell is the HARQ-ACK and/or SR on a PUCCH scheduled for transmission on the target cell.

SPS-PUCCH-AN-List-r16 or n1PUCCH-AN, e.g., if SPS HARQ-ACK is switched and is multiplexed with SPS HARQ-ACK of the target cell in the same slot/sub-slot.

PUCCH-ResourceSet, e.g., if switched HARQ-ACK is multiplexed with dynamic HARQ-ACK of the target cell in the same slot/sub-slot. The dynamic HARQ-ACK means HARQ-ACK feedback for dynamic PDSCH scheduling.

With reference to FIG. 14, according to embodiments A13-2, a PUCCH resource used for transmission of the PUCCH is indicated by a PUCCH resource indication (PRI) in the DCI, wherein the PRI indicates a resource within a PUCCH resource set associated with the determined cell/carrier.

Embodiment A13-3

For switching of the PUCCH cell/carrier carrying HARQ-ACK and/or SR. Prioritized transmission of switched HARQ-ACK and/or SR from the original cell and the scheduled HARQ-ACK and/or SR for the target cell can be support if they are collided at the same slot/sub-slot.

If switched HARQ-ACK from the original cell has higher priority than the scheduled HARQ-ACK for the target cell, then the scheduled HARQ-ACK for the target cell can be dropped.

If switched HARQ-ACK from the original cell has lower priority than the scheduled HARQ-ACK for the target cell, then the switched HARQ-ACK from the original cell can be dropped.

Embodiment A13-4

For switching of the PUCCH cell/carrier carrying HARQ-ACK and/or SR, multiplexing of switched HARQ-ACK and/or SR from the original cell and the scheduled HARQ-ACK and/or SR for the target cell can be supported if they collide at the same slot/sub-slot.

Multiplexing of various PUCCH formats for switched HARQ-ACK and/or SR and the scheduled HARQ-ACK and/or SR for the target cell is supported.

Existing multiplexing rule for different PUCCH format of HARQ-ACK(s) and/or SR(s) in Rel. 15/16 can be applied here.

Multiplexing of the same priority level or different priority levels for switched HARQ-ACK and/or SR and the scheduled HARQ-ACK and/or SR for the target cell is supported.

Multiplexing rule for different priority levels of HARQ-ACK(s) and/or SR(s) defined in Rel. 17 can be applied here.

With reference to FIG. 14, according to embodiments A13-4, the SPS PDSCH sent from the base station to the UE and dynamically granted PDSCH from the base station to the UE has the same priority level.

Embodiment A14

If PUCCH transmission at the slot/sub-slot determined by K1 in the DCI of the original cell is invalid, and if no other PUCCH cells with valid symbols is in the slot/sub-slot determined by K1 for uplink transmission within a cell group, the UE can be indicated to perform PUCCH switching to one of the PUCCH cells which has the earliest available valid symbols and PUCCH resource(s) for HARQ-ACK transmission. The UE defers HARQ-ACK transmission on the target cell after switching. Followings are schemes for PUCCH switching with deferred HARQ-ACK transmission.

Scheme 1: The deferred HARQ-ACK transmission on the target cell follows the same mechanism as SPS HARQ-ACK deferral Scheme 2: If the HARQ-ACK transmission, when deferred in the original cell, exceeds the maximum allowable deferral for HARQ-ACK feedback, the UE performs PUCCH switching to another cell for earlier PUCCH transmission. Otherwise, UE stays in the original cell and defers the HARQ-ACK transmission on the original cell.

With reference to FIG. 14, according to embodiments A13 and A14, a PUCCH format used for carrying the Type 1 HARQ-ACK codebook is configured for the determined cell/carrier.

Embodiment A15

Figure 5:
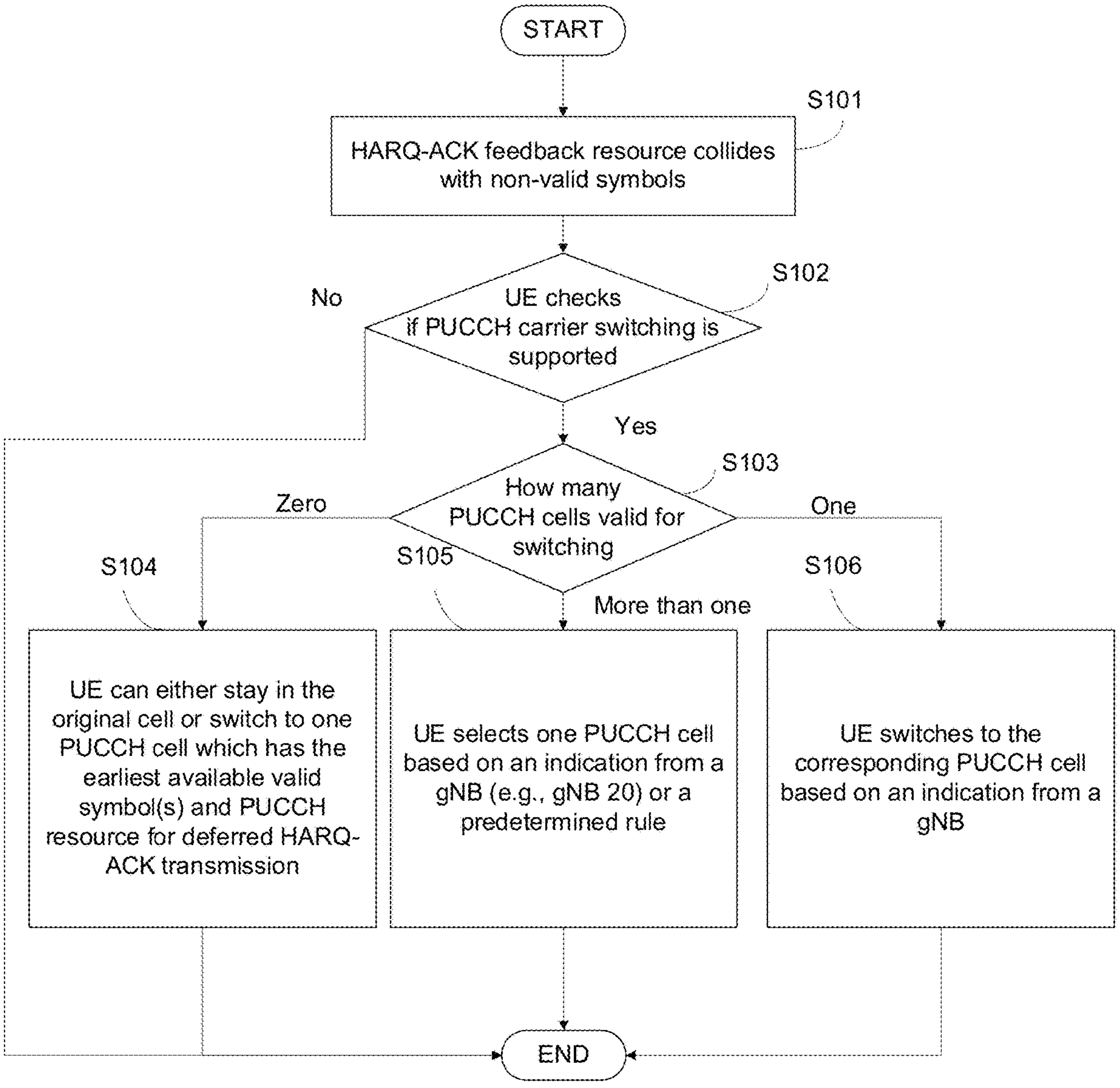
FIG. 5 illustrates a schematic view showing an embodiment of a target cell determination procedure.

With reference to FIG. 5, the UE executes an embodiment of a target cell determination procedure for determining a target PUCCH cell for PUCCH cell/carrier switching. An example of a procedure for determining a target PUCCH cell for PUCCH cell/carrier switching is detailed in the following.

The resource(s) for HARQ-ACK feedback responding to a corresponding SPS PDSCH or a scheduled PDSCH with respect to the indicated K1 value collides with non-valid symbols in the PCell (S101).

Based on serving cell configuration, the UE checks whether the function of PUCCH cell/carrier switching is supported (S102).

If the function of PUCCH cell/carrier switching is supported, the UE determines how many PUCCH cells valid for switching (S103). Specifically, the UE checks whether any PUCCH cell with valid symbol(s) is in the slot/sub-slot determined by K1 for uplink transmission within a PUCCH group (S103).

If no PUCCH cell with valid symbol(s) for PUCCH transmission is in the slot/sub-slot determined by K1 (i.e., a branch “Zero” between S103 and S104), the UE can either stay in the original cell or switch to one PUCCH cell which has the earliest available valid symbol(s) and PUCCH resource for deferred HARQ-ACK transmission (S104).

If more than one PUCCH cell with valid symbol(s) for PUCCH transmission is in the slot/sub-slot determined by K1 (i.e., a branch “More than one” between S103 and S105), the UE selects one PUCCH cell based on an indication from a gNB (e.g., gNB 20) or a predetermined rule in the embodiments of the disclosure (S105). The selected PUCCH cell serves as the target cell.

If only one PUCCH cell with valid symbol(s) for PUCCH transmission is in the slot/sub-slot determined by K1 (i.e., a branch "One" between S103 and S106), the UE switches to the corresponding PUCCH cell based on an indication from a gNB (e.g., gNB 20) (S106). The corresponding PUCCH cell serves as the target cell.

Embodiment A16

The gNB can send an indication to the UE, which instructs the UE to activate/enable HARQ-ACK deferral and/or PUCCH cell/carrier switching in the CA scenario to prevent HARQ-ACK dropping due to invalid symbol collision, e.g., HARQ ACK/NACK collides with semi-static DL symbol(s), flexible symbol(s) indicated for DL transmission by SFI, a synchronization signal block (SSB), or control-resource set zero (CORESET #0).

The gNB can configure the UE to activate/enable HARQ-ACK deferral and/or PUCCH cell/carrier switching or to prioritize HARQ-ACK deferral or PUCCH cell/carrier switching whenever collisions happen in the original cell in the CA scenario.

An indication to perform HARQ-ACK deferral and an indication to perform PUCCH cell/carrier switching can be jointly encoded in the same DCI.

With reference to FIG. 13, according to the embodiments A13-2, A13-3, A14, and A16, the base station further transmits a downlink control information (DCI) in a PDCCH, wherein the DCI comprises a HARQ-ACK feedback adjusting indicator to indicate the adjusted HARQ-ACK feedback slot/sub-slot location of the SPS HARQ-ACK bit responding to the received SPS PDSCH, and the base station determines the adjusted slot/sub-slot location n+K1_adj according to the HARQ-ACK feedback adjusting indicator. The UE further receives a downlink control information (DCI) in a PDCCH, wherein the DCI comprises a HARQ-ACK feedback adjusting indicator to indicate the adjusted HARQ-ACK feedback slot/sub-slot location of the SPS HARQ-ACK bit responding to the received SPS PDSCH, and the UE adjusts the HARQ-ACK feedback slot/sub-slot location to the adjusted slot/sub-slot location n+K1_adj according to the HARQ-ACK feedback adjusting indicator.

With reference to FIG. 13, according to the embodiments A1-1, A3, and A16, the valid symbols in the slot/sub-slot location of n+K1_adj for transmission of the PUCCH do not collide with semi-static DL symbols, synchronization signal block (SSB), or control-resource set zero (CORESET #0). At least one of the symbols in the slot/sub-slot location of n+K1 collides with semi-static DL symbols, SSB, or CORESET #0.

With reference to FIG. 13, according to the embodiments A13-2, A13-3, A14, and A16, the base station further transmits a downlink control information (DCI) in a physical downlink control channel (PDCCH), wherein the DCI comprises a HARQ-ACK feedback adjusting indicator to indicate the adjusted HARQ-ACK feedback slot/sub-slot location of the SPS HARQ-ACK bit responding to the received SPS PDSCH, and the adjusted slot/sub-slot location n+K1_adj is determined according to the HARQ-ACK feedback adjusting indicator. The UE further receives the downlink control information (DCI) in a physical downlink control channel (PDCCH), wherein the DCI comprises a HARQ-ACK feedback adjusting indicator to indicate the adjusted HARQ-ACK feedback slot/sub-slot location of the SPS HARQ-ACK bit responding to the received SPS PDSCH, and the UE adjusts the HARQ-ACK feedback slot/sub-slot location to the adjusted slot/sub-slot location n+K1_adj according to the HARQ-ACK feedback adjusting indicator. The value of K1 adj may be larger than K1.

Embodiment A17

In the scenario of CA and/or SUL, for dynamic switching of PUCCH cell/carrier carrying HARQ-ACK and/or SR based on DCI indication, the function of PUCCH cell/carrier indication field is illustrated in the following.

A PUCCH cell/carrier indication field in the DCI can indicate the PUCCH cell/carrier index for HARQ-ACK transmission responding to corresponding PDSCH(s). For UE receiving more than one DCIs at different slots, and each of the K1 values in DCIs indicates to the same slot for joint HARQ-ACK feedback, the PUCCH cell/carrier index in these DCIs can be the same.

A PUCCH cell/carrier indication field in the DCI can indicate a set of PUCCH cell/carrier indexes for different feedback slots. Similar to slot format indicator (SFI), a PUCCH cell/carrier indication field can indicate a set of PUCCH cell/carriers applied to more than one upcoming feedback slots. In this case, the content of PUCCH cell/carrier indication fields received in DCIs at different slots could be different.

Similar to PUCCH resource indicator (PRI) in DCI, a later received PUCCH cell/carrier indication field in the DCI can overwrite a previous received PUCCH cell/carrier indication field in the DCI. In this case, the UE determines the actual PUCCH cell/carrier index for PUCCH transmission based on the last received DCI.

Embodiment A18

In the scenario of CA and/or SUL, for dynamic switching of a PUCCH cell/carrier carrying HARQ-ACK and/or a scheduling request (SR) based on an DCI indication. If a field (referred to as a PUCCH cell/carrier indication field) indicating the PUCCH cell/carrier is included in the DCI of the original cell, then:

The field of PRI in the DCI is to indicate a PUCCH resource of a corresponding PUCCH cell/carrier, i.e., target cell.

The value of HARQ-ACK feedback timing K1 in the DCI is associated with the indicated PUCCH cell/carrier.

The PUCCH cell/carrier indication field can also indicate the original cell, e.g., PCell, of the UE.

The PUCCH cell/carrier indication field can indicate a PUCCH cell of one PUCCH group in a plurality of PUCCH groups of the UE. An index of the PUCCH group (referred to as a PUCCH group index) and an index of the PUCCH cell (referred to as a PUCCH cell index) within a PUCCH group can be separately or jointly encoded.

With reference to FIG. 2 and according to embodiment A5 and A18, the first PDSCH is received at slot/sub-slot location n-K1, K1 being a positive integer HARQ feedback timing offset, the UE determines the slot/sub-slot location n based on the HARQ feedback timing offset K1 indicated in the first DCI for transmitting a Type 1 HARQ-ACK codebook comprising a HARQ-ACK bit responding to the received first PDSCH, wherein the HARQ feedback timing offset K1 is determined based on numerology of the determined cell/carrier indicated in the first PUCCH cell/carrier indication, and a K1 set used for constructing the Type 1 HARQ-ACK codebook is associated with the determined cell/carrier indicated in the first PUCCH cell/carrier indication.

Figure 6:
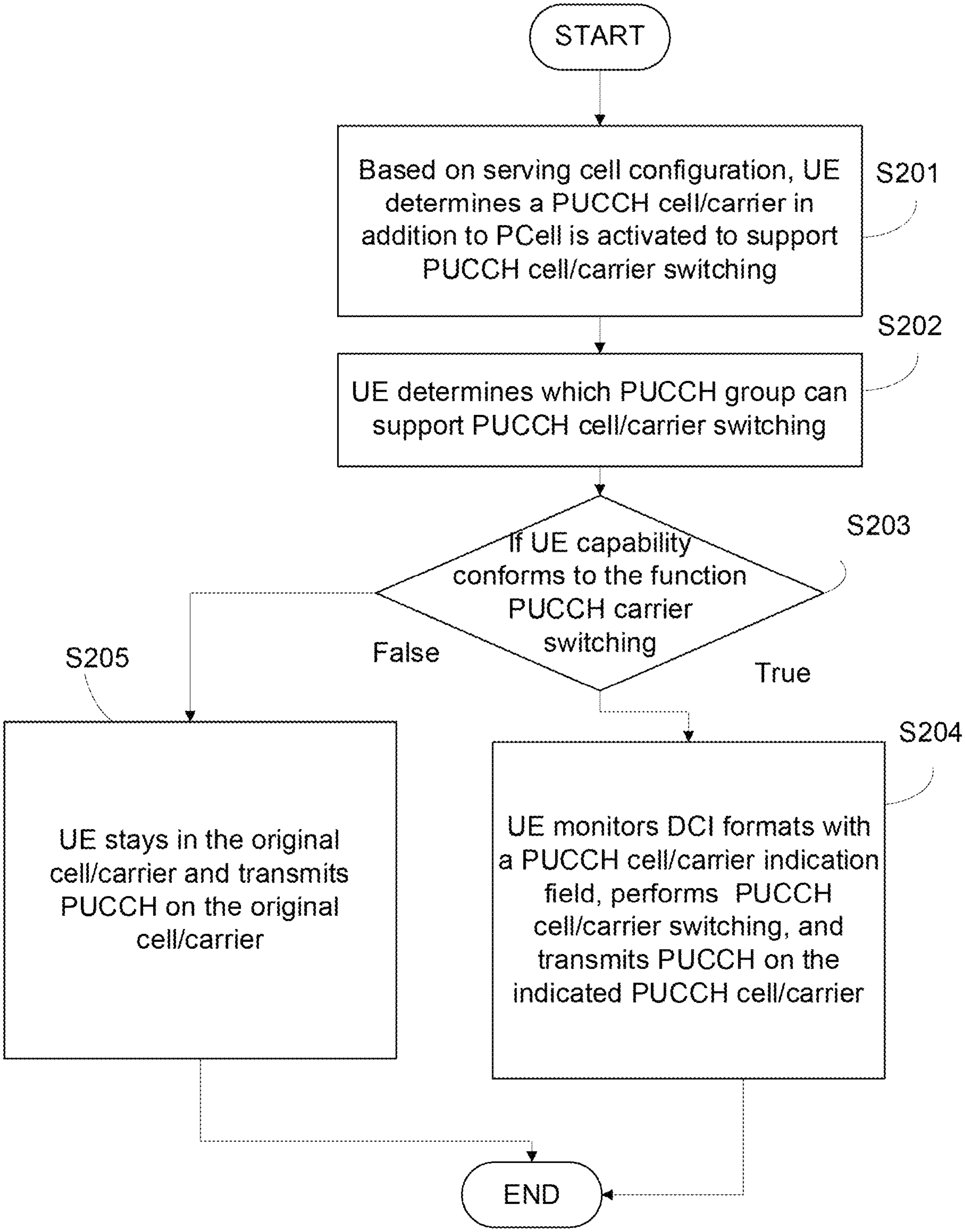
FIG. 6 illustrates a schematic view showing an example of a PUCCH cell/carrier switching procedure.

Embodiment A19: Example Procedure for Performing PUCCH Cell/Carrier Switching Based on DCI With reference to FIG. 6, the UE executes an embodiment of a PUCCH cell/carrier switching procedure. An example of a procedure for performing PUCCH cell/carrier switching based on DCI is detailed in the following.

Based on serving cell configuration, the UE determines whether any PUCCH cell/carrier in addition to PCell is activated to support PUCCH cell/carrier switching. When the UE determines a PUCCH cell/carrier in addition to PCell is activated to support PUCCH cell/carrier switching (S201), the UE determines which PUCCH group can support PUCCH cell/carrier switching based on PUCCH group configuration.

When the UE determines at least one PUCCH group in a plurality of PUCCH groups capable of PUCCH cell/carrier switching based on PUCCH group configuration (S202), the UE determines whether UE capability of the UE can match with the function of PUCCH cell/carrier switching (S203).

If at least one of PUCCH cell/carrier supporting PUCCH cell/carrier switching within a PUCCH group is activated and a UE capability of the UE can match with the function of PUCCH cell/carrier switching, the UE monitors DCI formats with a PUCCH cell/carrier indication field, performs PUCCH cell/carrier switching, and transmits PUCCH on the indicated PUCCH cell/carrier (S204). Specifically, the UE performs the following steps (S204):

The UE monitors at least one of DCI formats configured by a gNB, which includes a PUCCH cell/carrier indication field carrying the PUCCH cell/carrier indication.

The UE performs PUCCH cell/carrier switching according to the PUCCH cell/carrier indication field.

The UE transmits PUCCH on a PUCCH resource of a slot/sub-slot according to a PRI and K1 value of the indicated PUCCH cell/carrier in the DCI.

If no PUCCH cell/carrier supporting PUCCH cell/carrier switching within a PUCCH group is activated or UE's capability cannot match with the function of PUCCH cell/carrier switching S203, the UE stays in the original cell/carrier, transmits PUCCH on the original cell/carrier, and does not need to monitor PUCCH cell/carrier indication in a PUCCH cell/carrier indication field of the DCI (S205).

Embodiment A20

In the scenario of CA and/or SUL, for dynamic switching of the PUCCH cell/carrier for carrying HARQ-ACK and/or SR, if PUCCH repetition is configured, the following repetition pattern can be considered to determine the slot/sub-slot length of each repetition.

If PUCCH cell/carrier switching happens in the middle of PUCCH repetitions, PUCCH repetitions can be transmitted across different PUCCH cells/carriers over consecutive slots/sub-slots. Thus, the UE transmits a portion of the PUCCH repetitions on original cell and a portion of the PUCCH repetitions on target cell.

If SCS of the original cell is different from the SCS of the target cell, the UE may follow one or more of the different SCSs to transmit PUCCH repetitions.

For example, the UE follows the different SCS of the cells for transmitting PUCCH repetition at respective slots.

For example, the UE follows the SCS of either original cell or target cell for all PUCCH repetitions.

If PUCCH cell/carrier switching happens at the start of PUCCH repetitions, PUCCH repetitions are transmitted on the target cell with corresponding SCS. PUCCH repetitions can be transmitted on more than two PUCCH cells/carriers if PUCCH cell/carrier switching is triggered more than one time at different time points during transmission of PUCCH repetitions.

Embodiment B1: Multiplexing and HARQ-ACK Codebook Construction for Joint Operation of Dynamic and Semi-Static PUCCH Cell/Carrier Switching An embodiment comprises multiplexing HARQ-ACK codebook and HARQ-ACK codebook construction for joint operation of dynamic and semi-static PUCCH cell/carrier switching. A UE (e.g., the UE 10) capable of performing PUCCH cell/carrier switching based on a dynamic PUCCH cell/carrier indication in DCI and/or a semi-static PUCCH cell/carrier switching pattern, may perform UCI transmission (e.g., SR, CSI or HARQ-ACK transmission) without dynamic PUCCH cell/carrier indication for various types of uplink control signals (i.e., UCI) as described in one or more of the following cases.

Case 1: HARQ-ACK for SPS PDSCHs without corresponding DCI.

Case 2: HARQ-ACK for dynamically scheduled PDSCH not supporting PUCCH cell/carrier switching, e.g., fallback DCI. In this case, the UE transmits HARQ-ACK only on PCell/PSCell/PUCCH-SCell.

Case 3: HARQ-ACK for dynamic scheduled PDSCH without a PUCCH cell/carrier indication field configured in DCI.

Case 4: HARQ-ACK for SPS activation DCI and SPS release DCI without a PUCCH cell/carrier indication field configured in DCI.

Case 5: HARQ-ACK for dynamic scheduled or semi-static scheduled PDSCH, wherein the PUCCH cell/carrier switching is configured to be based on a semi-static PUCCH cell/carrier switching pattern.

Case 6: SR with periodicity/offset/SR resource configuration on a UL BWP of a PUCCH cell/carrier and the PUCCH cell/carrier switching for SR transmission is determined based on a semi-static PUCCH cell/carrier switching pattern.

Case 7: CSI for periodic or semi-persistent CSI feedback with periodicity/offset/CSI resource configuration on a UL BWP of a PUCCH cell/carrier and the PUCCH cell/carrier switching for CSI transmission is determined based on a semi-static PUCCH cell/carrier switching pattern.

At least one of the following operations can be anticipated by UE or configured by gNB:

Operation 1 (for the same target cell and multiplexing):

If the slot/sub-slot used for transmission of HARQ-ACK, SR or CSI feedback in Case 1-7 is overlapped with the slot/sub-slot used for HARQ-ACK transmission of a scheduled PDSCH, the UE expects the target cell/carrier determined in Case 1-7 for transmission of HARQ-ACK, SR or CSI feedback and the target cell/carrier determined based on a dynamic PUCCH cell/carrier indication for HARQ-ACK transmission of the scheduled PDSCH are the same on the overlapped slot/sub-slot.

For UCI multiplexing of SR or CSI on the same target cell/carrier, interpretation of periodicity/offset for slot/sub-slot location for SR or CSI transmission is associated with the numerology of a reference cell/carrier, e.g., PCell/PSCell/PUCCH-SCell.

For UCI multiplexing on the same target cell/carrier, interpretation of PDSCH to HARQ-ACK offset K1 and K1 set for Type 1 HARQ-ACK codebook is associated with the dynamically indicated PUCCH cell/carrier indicated by a dynamic PUCCH cell/carrier indication.

Operation 2 (for different target cells and multiplexing):

If the slot/sub-slot used for transmission of HARQ-ACK, SR or CSI feedback in Case 1-7 is overlapped with the slot/sub-slot used for HARQ-ACK transmission of a scheduled PDSCH, and the target cell/carrier determined in Case 1-7 for transmission of HARQ-ACK, SR or CSI feedback and the target cell/carrier determined based on dynamic PUCCH cell/carrier indication for HARQ-ACK transmission of the scheduled PDSCH are different, the UE multiplexes the SR, CSI or HARQ-ACK in Case 1-7 with HARQ-ACK transmission of a scheduled PDSCH, and transmits the multiplexed UCI information on the target cell/carrier indicated by a dynamic PUCCH cell/carrier indication.

Numerology used for determining periodicity/offset for slot/sub-slot location(s) of SR or CSI transmission is based on a reference cell/carrier, e.g., PCell/PSCell/PUCCH-SCell.

Numerology used for PDSCH to HARQ-ACK offset K1 interpretation and K1 set used for the Type 1 Codebook construction on the dynamically indicated cell/carrier can be one of the following alternatives.

Alternative 1: The interpretation of PDSCH to HARQ-ACK offset K1 and K1 set for Type 1 HARQ-ACK codebook is based on dynamically indicated PUCCH cell/carrier. Specifically, HARQ-ACK(s) for PDSCH without dynamic PUCCH cell/carrier indication follow the K1 set of a target PUCCH cell/carrier indicated in DCI.

If the K1 sets configured for the PUCCH target cell/carrier without dynamic PUCCH cell/carrier indication and the PUCCH target cell/carrier with a dynamic PUCCH cell/carrier indication are different, the Type 1 HARQ-ACK codebook is constructed based on the K1 set of PUCCH target cell/carrier with a dynamic PUCCH cell/carrier indication. For the K1 value(s) not included in the K1 set of a dynamically indicated PUCCH target cell/carrier, the corresponding HARQ-ACK bits can be skipped or appended to the Type 1 HARQ-ACK codebook generated based on the K1 set of a dynamically indicated PUCCH cell/carrier.

Alternative 2: The interpretation of PDSCH to HARQ-ACK offset K1 and K1 set is determined according to a reference cell/carrier, e.g., PCell/PSCell/PUCCH-SCell, for the target cell/carrier without dynamic PUCCH cell/carrier indication in a first portion of Type 1 Codebook in Type 1 Codebook construction. Specifically, the generated HARQ-ACK bits according to the interpretation are collected in a first portion of Type 1 Codebook in Type 1 Codebook construction. The interpretation of PDSCH to HARQ-ACK offset K1 and K1 set is determined according to the dynamically indicated PUCCH cell/carrier for the target cell/carrier with dynamic PUCCH cell/carrier indication in a second portion of Type 1 Codebook in Type 1 Codebook construction. The final Type 1 Codebook is generated from the concatenation of the first portion and the second portion of Type 1 Codebook in any order. Specifically, the generated HARQ-ACK bits according to the interpretation are collected in a second portion of Type 1 Codebook in Type 1 Codebook construction.

K1 interpretation means interpretation of K1 granularity in terms of length of slot/sub-slot.

Embodiment B1-1

Figure 7:
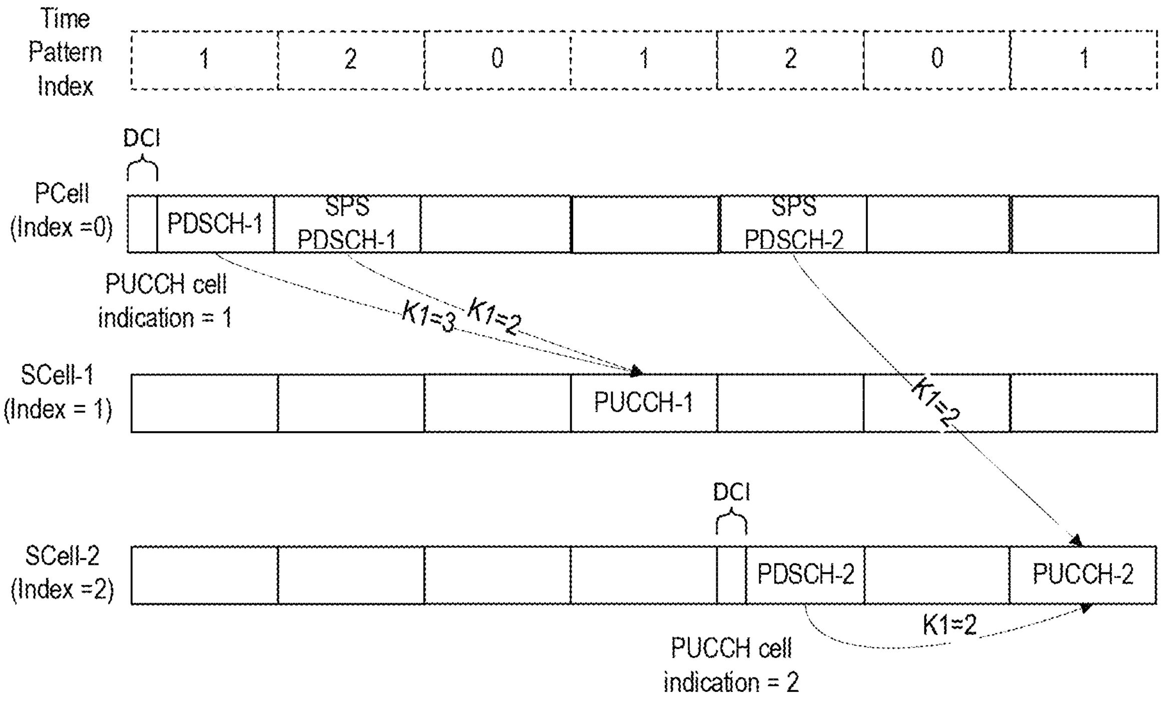
FIG. 7 illustrates a schematic view showing an example of an operating procedure for determining PUCCH cell/carrier for HARQ-ACK transmission.

With reference to FIG. 7, an embodiment includes an operating procedure for determining PUCCH cell/carrier for HARQ-ACK transmission responding to SPS PDSCH without corresponding PDCCH overlapped with the HARQ-ACK of scheduled PDSCH using dynamic carrier indication on the same slot/sub-slot.

The UE receives an RRC configuration, including a time pattern for semi-static PUCCH cell/carrier switching over PCell, SCell-1 and SCell-2 in a PUCCH group.

The UE receives a DCI with a dynamic PUCCH cell/carrier indication and K1 value indication for HARQ-ACK transmission of scheduled PDSCH (e.g., PDSCH-1 in PCell or PDSCH-2 in SCell-2).

The UE receives an SPS PDSCH without corresponding PDCCH (e.g., SPS PDSCH-1 or SPS PDSCH-2), and the UE derives a PUCCH cell/carrier index for SPS HARQ-ACK transmission according to a semi-static time pattern and determines the slot/sub-slot for SPS HARQ-ACK transmission according to a K1 value (as detailed in Scheme 1 of Embodiment B3)

If the slot/sub-slot for HARQ-ACK feedback responding to scheduled PDSCH and SPS PDSCH are overlapped (e.g., in PUCCH-1 and PUCCH-2), the HARQ-ACK of SPS PDSCH is multiplexed on the target PUCCH cell/carrier (e.g., SCell-1 for PDSCH-1 or SCell-2 for PDSCH-2) dynamically indicated by a field in the DCI of received PDSCH (i.e., dynamically granted PDSCH or DG PDSCH).

The UE generates a Type 1 Codebook based on the K1 value and K1 set associated with the numerology configured for dynamically indicated PUCCH cell/carrier.

The UE transmits the Type 1 Codebook on the PUCCH resource associated with the dynamically indicated PUCCH cell/carrier indicated by a PRI in the DCI of the received PDSCH (i.e., dynamically granted PDSCH or DG PDSCH).

Embodiment B2: Operation of PUCCH Cell/Carrier Switching for HARQ-ACK Transmission of Case1-5 in Embodiment B1 Based on Semi-Static PUCCH Cell/Carrier Switching In an embodiment, the UE has been RRC configured with a semi-static PUCCH cell/carrier time pattern. For Case1-5, an embodiment of a process for determining the target PUCCH cell/carrier for HARQ-ACK transmission is detailed in the following:

The UE firstly determines a slot/sub-slot location (e.g., slot/sub-slot location n) for HARQ-ACK transmission according to the PDSCH to HARQ-ACK offset K1 in DCI (e.g., activation DCI or released DCI) or a K1 value configured in RRC signaling (i.e., for SPS PDSCH). The K1 value can be interpreted based on numerology of a reference cell/carrier. The reference cell/carrier may be a default cell/carrier or a determined cell/carrier, such as PCell/PSCell/PUCCH-SCell, or a cell/carrier configured by gNB.

The UE then determines the target cell for HARQ-ACK transmission in the determined slot/sub-slot location according to the semi-static PUCCH cell/carrier time pattern.

With reference to FIG. 2, embodiments A7 and B2, the first PDSCH is scheduled by the first DCI, the first PDSCH comprises a dynamically scheduled PDSCH or a semi-persistent scheduling (SPS) PDSCH, and the first DCI comprises a scheduling DCI or an activation DCI.

Embodiment B2-1

Figure 8:
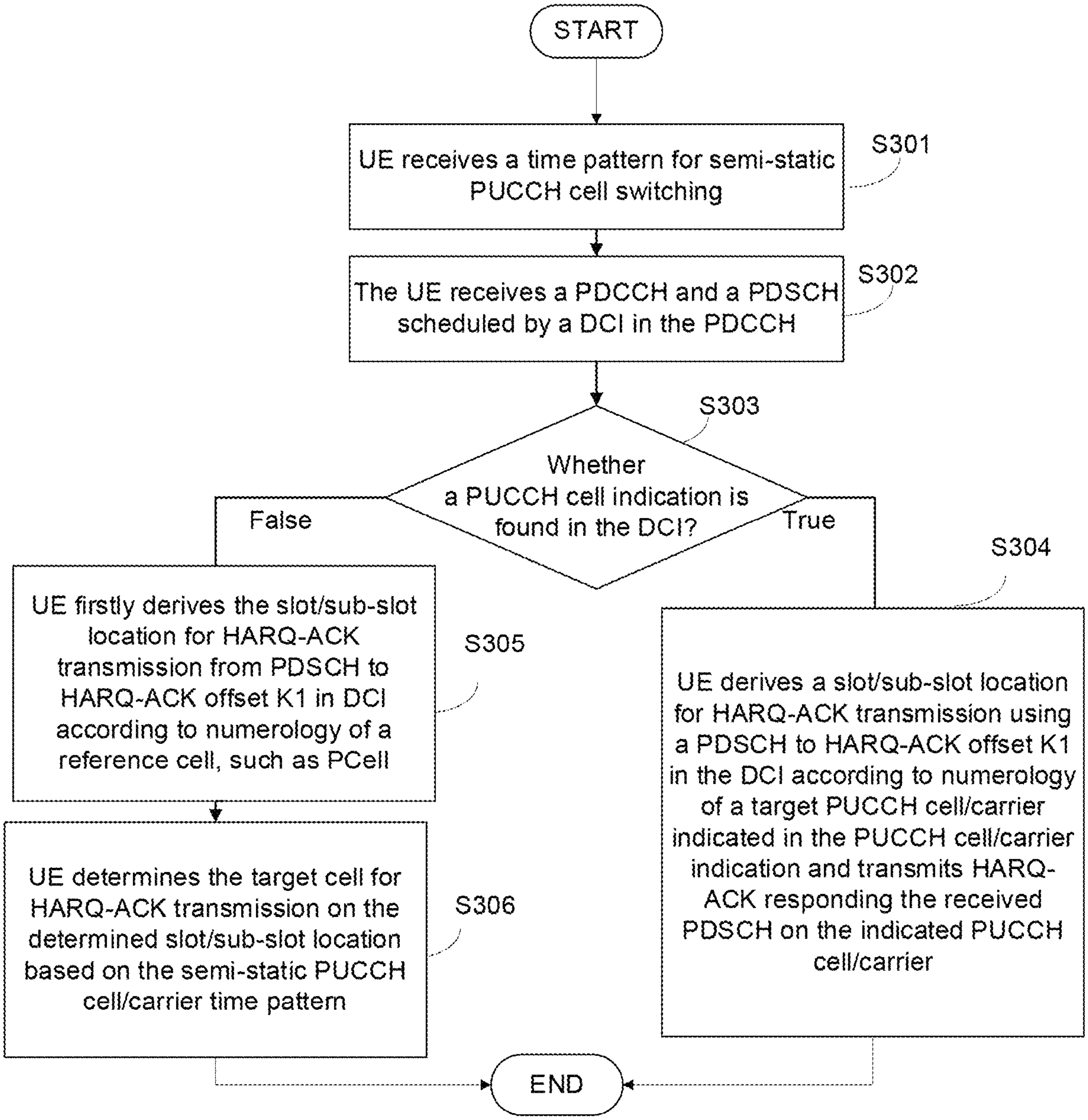
FIG. 8 illustrates a schematic view showing an example of a PUCCH cell/carrier switching procedure for HARQ-ACK transmission based on semi-static PUCCH cell/carrier switching.

With reference to FIG. 8, the UE executes an operating procedure of PUCCH cell/carrier switching for HARQ-ACK transmission based on semi-static PUCCH cell/carrier switching for scheduled PDSCH with or without a dynamic PUCCH cell/carrier indication.

The UE receives an RRC signaling with a time pattern of each slot/sub-slot within a period for semi-static PUCCH cell/carrier switching over PUCCH cell/carriers supporting PUCCH cell/carrier switching in a PUCCH group (S301).

The UE receives a PDCCH and a PDSCH scheduled by a DCI in the PDCCH (S302).

The UE determines whether a dynamic PUCCH cell/carrier indication for HARQ-ACK transmission with respect to the received PDSCH can be found in the DCI (S303).

If a dynamic PUCCH cell/carrier indication for HARQ-ACK transmission with respect to the received PDSCH is in the DCI, the UE derives a slot/sub-slot location for HARQ-ACK transmission using a PDSCH to HARQ-ACK offset K1 in the DCI according to numerology of a target PUCCH cell/carrier indicated in the PUCCH cell/carrier indication and transmits HARQ-ACK responding the received PDSCH on the indicated PUCCH cell/carrier (S304).

If a dynamic PUCCH cell/carrier indication for HARQ-ACK transmission with respect to the received PDSCH is not found in the DCI, the UE firstly derives the slot/sub-slot location for HARQ-ACK transmission from PDSCH to HARQ-ACK offset K1 in DCI according to numerology of a reference cell, such as PCell (S305).

The UE determines the target cell for HARQ-ACK transmission on the determined slot/sub-slot location based on the semi-static PUCCH cell/carrier time pattern (S306).

Embodiment B3: Determination of a PUCCH Cell/Carrier for HARQ-ACK Transmission of SPS PDSCH without Corresponding DCI The UE may determine a PUCCH cell/carrier for HARQ-ACK transmission of SPS PDSCH without corresponding DCI based on at least one of following schemes:

Scheme 1:

Selecting a PUCCH cell/carrier for transmission of HARQ-ACK responding to SPS PDSCH without corresponding PDCCH is based on semi-static PUCCH cell/carrier switching according to a time pattern configured through RRC signaling.

The UE derives a slot/sub-slot for SPS HARQ-ACK transmission according to a configured K1 value and determines a PUCCH cell/carrier index for SPS HARQ-ACK transmission according to a configured semi-static time pattern.

The same semi-static PUCCH cell/carrier time pattern can be applied to SPS HARQ-ACK with different activated SPS configurations.

Interpretation of K1 (referred to as K1 interpretation) and K1 set for Type 1 Codebook construction of multiplexed HARQ-ACK feedback for SPS PDSCH and HARQ-ACK feedback for dynamic scheduled PDSCH and/or SPS PDSCH release is based on a reference cell/carrier, e.g., PCell/PSCell/PUCCH-SCell or configured by a gNB (e.g., gNB 20).

Scheme 2:

Selecting a PUCCH cell/carrier for transmission of HARQ-ACK responding to SPS PDSCH without corresponding PDCCH is based on a dynamic PUCCH cell/carrier switching index indicated in the activation DCI of SPS PDSCH. The dynamic PUCCH cell/carrier switching index dynamically indicates an index of a PUCCH cell/carrier as the index of the target PUCCH cell/carrier in PUCCH cell/carrier switching.

The scheme for the UE to derive the PUCCH cell/carrier index for SPS HARQ-ACK transmission without corresponding PDCCH is the same as the scheme for UE to derive the PUCCH cell/carrier index for SPS HARQ-ACK transmission with an activation DCI.

For SPS configurations activated by different activation DCIs, the dynamically indicated PUCCH cells/carriers for different activated SPS configurations can be the same or different.

If there is the same PUCCH cell/carrier indicated for SPS HARQ-ACK transmission on the same slot/sub-slot for one or more than one SPS configurations, the K1 interpretation and K1 set for codebook construction of SPS HARQ-ACKs is based on the target PUCCH cell/carrier indicated by the activation DCI.

If different PUCCH cells/carriers indicated for SPS HARQ-ACK transmission on the overlapped slot/sub-slot are associated with different SPS configurations. SPS HARQ-ACKs are multiplexed and only one of the PUCCH cells/carriers can be selected as the target PUCCH cell/carrier for transmission of the multiplexed SPS HARQ-ACKs. The K1 interpretation and K1 set for codebook construction of SPS HARQ-ACKs is based on the selected PUCCH cell/carrier.

Selection of one PUCCH cell/carrier from different PUCCH cells/carriers associated with different SPS configurations can be based on one of the following:

Priority levels of SPS configurations: For example, the target PUCCH cell/carrier is selected according to the dynamic PUCCH cell/carrier indication (i.e., the dynamic PUCCH cell/carrier switching index) for an SPS configuration with the highest priority.

Index level of SPS configurations: For example, the target PUCCH cell/carrier is selected according to the dynamic PUCCH cell/carrier indication (i.e., the dynamic PUCCH cell/carrier switching index) for a SPS configuration with the lowest index level.

A default PUCCH cell/carrier: For example, the UE transmits SPS HARQ-ACKs on the default PUCCH cell/carrier (e.g., PCell/PSCell/PUCCH-SCell) and ignores dynamic PUCCH cell/carrier indications.

Scheme 3:

PUCCH cell/carrier for HARQ-ACK transmission of SPS PDSCH without corresponding PDCCH is transmitted on the PCell/PSCell/PUCCH-SCell. That is, the function of PUCCH cell/carrier switching for HARQ-ACK transmission of SPS PDSCH without corresponding PDCCH is not supported.

With reference to FIG. 13, according to embodiment B3, the K1_adj is determined based on numerology of the first type cell/carrier.

With reference to FIG. 13, according to embodiment B3, the UE constructs a Type 1 HARQ-ACK codebook, the Type 1 HARQ-ACK codebook comprises the SPS HARQ-ACK bit for transmission on the PUCCH at the slot/sub-slot location n+K1_adj, a K1 set used for constructing the Type 1 HARQ-ACK codebook is associated with the first type cell/carrier. The base station receives a Type 1 HARQ-ACK codebook, the Type 1 HARQ-ACK codebook comprises the SPS HARQ-ACK bit on the PUCCH at the slot/sub-slot location n+K1_adj, a K1 set used for constructing the Type 1 HARQ-ACK codebook is associated with the first type cell/carrier.

With reference to FIG. 13, according to embodiment B3, the slot/sub-slot location of n+K1_adj is determined based on numerology of the first type cell/carrier.

With reference to FIG. 13, according to embodiment B3, the UE constructs a Type 1 HARQ-ACK codebook, the Type 1 HARQ-ACK codebook comprises the SPS HARQ-ACK bit for transmitting on the PUCCH at the slot/sub-slot location n+K1_adj, a K1 set used for constructing the Type 1 HARQ-ACK codebook is associated with the first type cell/carrier. The base station receives the Type 1 HARQ-ACK codebook, the Type 1 HARQ-ACK codebook comprises the SPS HARQ-ACK bit for transmitting on the PUCCH at the slot/sub-slot location n+K1_adj, a K1 set used for constructing the Type 1 HARQ-ACK codebook is associated with the first type cell/carrier.

With reference to FIG. 14, according to embodiment B3, the UE constructs a Type 1 HARQ-ACK codebook, the Type 1 HARQ-ACK codebook comprises the SPS HARQ-ACK bit for transmission on the PUCCH, a K1 set used for constructing the Type 1 HARQ-ACK codebook is associated with the first type cell/carrier, and the HARQ feedback timing indicator K1 is determined based on numerology of the first type cell/carrier. The base station receives the Type 1 HARQ-ACK codebook, the Type 1 HARQ-ACK codebook comprises the SPS HARQ-ACK bit for transmission on the PUCCH, a K1 set used for constructing the Type 1 HARQ-ACK codebook is associated with the first type cell/carrier, and the HARQ feedback timing indicator K1 is determined based on numerology of the first type cell/carrier.

With reference to FIG. 14, according to embodiment B3, the base station further transmits an initial SPS PDSCH associated with the activation DCI, and the activation DCI comprises a PUCCH cell/carrier indication instructing the UE to transmit PUCCH on a first type cell/carrier or a second type cell/carrier. The base station determines the first type cell/carrier as the determined cell/carrier for receiving the PUCCH at the slot/sub-slot location n. The UE further receives the initial SPS PDSCH associated with the activation DCI, and the activation DCI comprises the PUCCH cell/carrier indication instructing the UE to transmit PUCCH on a first type cell/carrier or a second type cell/carrier. The UE determines the first type cell/carrier as the determined cell/carrier for transmitting the PUCCH at the slot/sub-slot location n.

With reference to FIG. 14, according to embodiment B3, the HARQ feedback timing indicator K1 is indicated in the activation DCI. The UE determines the slot/sub-slot location n based on the HARQ feedback timing indicator K1 indicated in the activation DCI, and the base station determines the slot/sub-slot location n based on the HARQ feedback timing indicator K1 indicated in the activation DCI.

With reference to FIG. 14, according to embodiment B3, the base station further transmits configuration information comprising a PUCCH cell/carrier switching time pattern for PUCCH cell/carrier switching within a PUCCH group. The base station determines the cell/carrier for receiving the PUCCH at the slot/sub-slot location n based on a bit indication in the PUCCH cell/carrier switching time pattern. The UE further receives the configuration information comprising the PUCCH cell/carrier switching time pattern for PUCCH cell/carrier switching within a PUCCH group. The UE determines the cell/carrier for transmitting the PUCCH at the slot/sub-slot location n based on a bit indication in the PUCCH cell/carrier switching time pattern.

Embodiment B4: Multiplexing HARQ-ACK of Dynamically Scheduled PDSCH and HARQ-ACK of SPS PDSCH In an embodiment, a UE may multiplex HARQ-ACK of dynamically scheduled PDSCH without PUCCH cell/carrier switching indication and HARQ-ACK of SPS PDSCH without corresponding DCI on a target PUCCH cell/carrier based on semi-static PUCCH cell/carrier switching.

In an embodiment, a UE capable of performing PUCCH cell/carrier switching based on a time pattern for semi-static PUCCH cell/carrier switching (referred to as a semi-static PUCCH cell/carrier switching pattern). If the slot/sub-slot for HARQ-ACK transmission responding to a dynamically scheduled PDSCH without a field (referred to as a PUCCH cell/carrier switching field) configured in DCI indicating PUCCH cell/carrier switching or a dynamically scheduled PDSCH using a fallback DCI is overlapped with the slot/sub-slot for HARQ-ACK transmission responding to an SPS PDSCH without corresponding DCI using semi-static PUCCH cell/carrier switching, the UE performs one or more of the following operations.

- The UE multiplexes HARQ-ACK responding to dynamically scheduled PDSCH without dynamic PUCCH cell/carrier indication and HARQ-ACK of SPS PDSCH without corresponding DCI on the target cell/carrier according to the semi-static time pattern.
  - A reference cell/carrier (e.g., PCell/PSCell/PUCCH-SCell) is used as a numerology reference to determine slot/sub-slot length for a semi-static time pattern and interpretation of K1 value.
  - For the construction of Type 1 HARQ-ACK codebook on the semi-static indicated target PUCCH cell/carrier, a K1 set selected for Type 1 HARQ-ACK codebook construction can be derived based on one of the following schemes:
    - Based on the K1 set of a reference cell/carrier, e.g., PCell/PSCell/PUCCH-SCell; and
    - Based on the K1 set of the target cell/carrier indicated by the semi-static PUCCH cell/carrier switching pattern.
- For different numerologies between the reference cell/carrier and the target cell/carrier, if PUCCH slot/sub-slot length (i.e., larger SCS) on the target PUCCH cell/carrier is shorter than the slot/sub-slot on the reference cell/carrier, then:

The first overlapping slot/sub-slot on the target PUCCH cell/carrier is selected for Type 1 HARQ-ACK codebook construction.

The PUCCH resource for the Type 1 HARQ-ACK codebook is selected according to a PUCCH resource indication (PRI) and is associated with a PUCCH resource of the target PUCCH cell/carrier.

The PRI dynamically indicated in DCI that dynamically schedules a PDSCH and also dynamically indicates the target PUCCH cell/carrier for the PDSCH can overwrite the PRI configured by RRC signaling for an SPS PDSCH while the UE multiplexes HARQ-ACK of the SPS PDSCH and HARQ-ACK of the dynamically scheduled PDSCH to the dynamically indicated target PUCCH cell/carrier on the same slot.

With reference to FIG. 3, according to embodiments A5, B2, and B4, the PDSCH is received at slot/sub-slot location n-K1, K1 being a positive integer HARQ feedback timing offset, the UE determines the slot/sub-slot location n based on the HARQ feedback timing offset K1 indicated in the DCI for transmitting a Type 1 HARQ-ACK codebook comprising a HARQ-ACK bit responding to the received PDSCH, wherein the HARQ feedback timing offset K1 is determined based on numerology of the first type cell/carrier, and a K1 set for constructing the Type 1 HARQ-ACK codebook is defined for the first type cell/carrier.

With reference to FIG. 3, according to embodiments A6, A8, A18, and B4, at least one PUCCH resource for transmission of the PUCCH at slot/sub-slot location n is configured for the at least one second type cell/carrier supporting PUCCH cell/carrier switching.

Additionally, the at least one PUCCH resource used for transmission of the PUCCH is indicated by a PUCCH resource indication (PRI) in the DCI with respect to the at least one second type cell/carrier indicated by the switching sequence.

With reference to FIG. 3, according to embodiment B4, if the PUCCH slot/sub-slot length of the at least one second type cell/carrier is shorter than the slot/sub-slot length of the first type cell/carrier, the UE selects the first slot/sub-slot of the at least one second type cell/carrier overlapping with the slot/sub-slot location n of the first type cell/carrier for transmission of the PUCCH.

With reference to FIG. 13, according to embodiment B4, at the slot/sub-slot location n+K1_adj, if a PUCCH slot/sub-slot length in the determined PUCCH cell/carrier is shorter than a slot/sub-slot length in the first type cell/carrier, the UE selects the first slot/sub-slot of the determined PUCCH cell/carrier type overlapping with the slot/sub-slot location n+K1_adj of the first type cell/carrier for transmission of the PUCCH. At the slot/sub-slot location n+K1_adj, if a PUCCH slot/sub-slot length in the determined PUCCH cell/carrier is shorter than a slot/sub-slot length in the first type cell/carrier, the first slot/sub-slot of the determined PUCCH cell/carrier type overlapping with the slot/sub-slot location n+K1_adj of the first type cell/carrier is used by the gNB 20 for receiving of the PUCCH.

With reference to FIG. 14, according to embodiment B4, the first type cell/carrier is one of a primary cell (PCell), primary secondary cell (PSCell), or PUCCH-SCell in a PUCCH group, and the second type cell/carrier is one of secondary cells (SCells) within the same PUCCH group.

With reference to FIG. 14, according to embodiment B4, the base station further transmits a dynamically granted PDSCH associated with a DCI. The UE further receives the dynamically granted PDSCH associated with a DCI and generates a HARQ-ACK bit in response to the received dynamically granted PDSCH. The UE determines a slot/sub-slot location n' for transmitting the HARQ-ACK bit based on a HARQ feedback timing indicator K1 indicated in the DCI, wherein n=n'. The UE multiplexes the SPS HARQ-ACK bit and the HARQ-ACK bit, and transmits the multiplexed bits in the same PUCCH at slot/sub-slot location n. A slot/sub-slot location n' for receiving the HARQ-ACK bit is determined by the base station based on a HARQ feedback timing indicator K1 indicated in the DCI, wherein n=n'. The SPS HARQ-ACK bit and the HARQ-ACK bit are multiplexed, and the base station receives the multiplexed bits in the same PUCCH at slot/sub-slot location n.

With reference to FIG. 14, according to embodiment B4, the UE constructs a Type 1 HARQ-ACK codebook comprising the HARQ-ACK bit and the SPS HARQ-ACK bit, wherein a K1 set used for constructing the Type 1 HARQ-ACK codebook is associated with the first type cell/carrier, and the HARQ feedback timing indicator K1 is determined based on numerology of the first type cell/carrier. The base station receives the Type 1 HARQ-ACK codebook comprising the HARQ-ACK bit and the SPS HARQ-ACK bit, wherein a K1 set used for constructing the Type 1 HARQ-ACK codebook is associated with the first type cell/carrier, and the HARQ feedback timing indicator K1 is determined based on numerology of the first type cell/carrier.

With reference to FIG. 14, according to embodiment B4, a PUCCH resource used for transmission of the PUCCH is indicated by a PUCCH resource indication (PRI) in the DCI, wherein the PRI indicates a resource within a PUCCH resource set associated with the determined cell/carrier.

With reference to FIG. 14, according to embodiment B4, the base station further transmits a dynamically granted PDSCH associated with a DCI. The DCI comprises a PUCCH cell/carrier indication instructing the UE 10 to transmit PUCCH on a first type cell/carrier or a second type cell/carrier. The UE 10 further receives the dynamically granted PDSCH associated with a DCI. The DCI comprises a PUCCH cell/carrier indication instructing the UE to transmit PUCCH on a first type cell/carrier or a second type cell/carrier. The UE generates a HARQ-ACK bit in response to the received dynamically granted PDSCH, and determines a slot/sub-slot location n' for transmitting the HARQ-ACK bit based on a HARQ feedback timing indicator K1 indicated in the DCI, wherein n=n'. The UE multiplexes the SPS HARQ-ACK bit and the HARQ-ACK bit, and transmits the multiplexed bits in the same PUCCH at slot/sub-slot location n. The UE determines the cell/carrier for transmitting the PUCCH at slot/sub-slot location n based on the PUCCH cell/carrier indication. The SPS HARQ-ACK bit and the HARQ-ACK bit are received by the base station in the same PUCCH at slot/sub-slot location n. The base station determines the cell/carrier for receiving the PUCCH at slot/sub-slot location n based on the PUCCH cell/carrier indication.

With reference to FIG. 14, according to embodiment B4, the UE constructs a Type 1 HARQ-ACK codebook comprising the HARQ-ACK bit and the SPS HARQ-ACK bit, wherein a K1 set used for constructing the Type 1 HARQ-ACK codebook is associated with the determined cell/carrier, and the HARQ feedback timing indicator K1 is determined based on numerology of the determined cell/carrier. The base station receives a Type 1 HARQ-ACK codebook comprising the HARQ-ACK bit and the SPS HARQ-ACK bit, wherein a K1 set used for constructing the Type 1 HARQ-ACK codebook is associated with the determined cell/carrier, and the HARQ feedback timing indicator K1 is determined based on numerology of the determined cell/carrier. In an embodiment, in the Type 1 HARQ-ACK codebook, the SPS HARQ-ACK bit is appended at the end of the HARQ-ACK bit.

Embodiment B4-1

Figure 9:
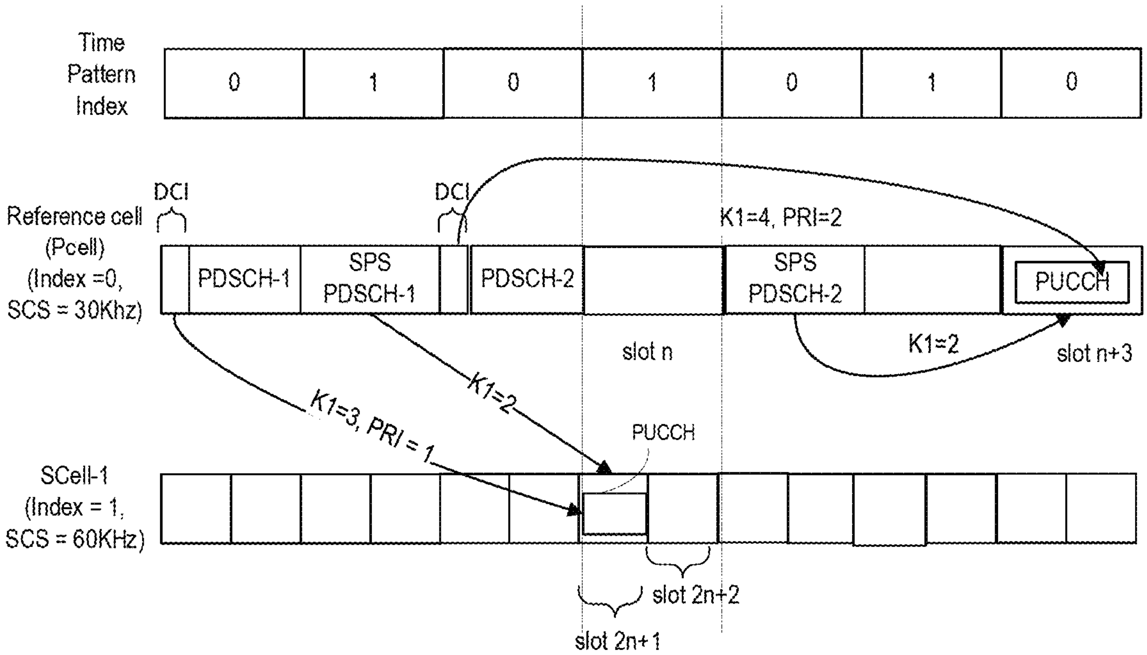
FIG. 9 illustrates a schematic view showing a procedure of multiplexing HARQ-ACK.

With reference to FIG. 9, an embodiment of the disclosure comprises a procedure of multiplexing HARQ-ACK of dynamically scheduled PDSCH without PUCCH cell/carrier indication and HARQ-ACK of SPS PDSCH without corresponding DCI to a target PUCCH cell/carrier according to semi-static PUCCH cell/carrier switching.

The UE receives an RRC configuration of a time pattern for semi-static PUCCH cell/carrier switching over PCell and SCell-1 in a PUCCH group.

The UE receives a DCI without a dynamic PUCCH cell/carrier indication, but with a PUCCH resource indication (PRI) and a K1 value indication for HARQ-ACK transmission of scheduled PDSCH (i.e., PDSCH-1 or PDSCH-2 in PCell).

The UE receives an SPS PDSCH without a corresponding PDCCH (i.e., SPS PDSCH-1 or SPS PDSCH-2), and the UE derives the PUCCH cell/carrier index of the slot for SPS HARQ-ACK transmission according to a K1 value and the semi-static PUCCH cell/carrier switching pattern (e.g., Scheme1 in Embodiment B3).

If the HARQ-ACK feedback slot for scheduled PDSCH and SPS PDSCH are overlapped (i.e., in slot n and slot n+3), the HARQ-ACK of scheduled PDSCH and SPS PDSCH are multiplexed on the target PUCCH cell/carrier determined based on a time pattern (i.e., SCell-1 in slot n and PCell in slot n+3).

For different numerologies between the reference cell/carrier and the semi-statically determined target cell/carrier, the UE transmits the Type 1 Codebook on the first overlapping slot of the semi-statically determined target PUCCH cell/carrier (i.e., slot **2*n*+1** of SCell-1).

The UE generates a Type 1 Codebook based on the K1 value and a K1 set with corresponding numerology configured for the semi-statically determined target PUCCH cell/carrier.

The UE transmits the Type 1 Codebook on the PUCCH resource indicated in the PRI of DCI (i.e., PRI=1 in slot **2*n*+1** for SCell-1 and PRI=2 in slot n+3 for PCell) configured for the semi-statically determined target PUCCH cell/carrier.

Embodiment B5: Dynamic PUCCH Resource Indication

Figure 10:
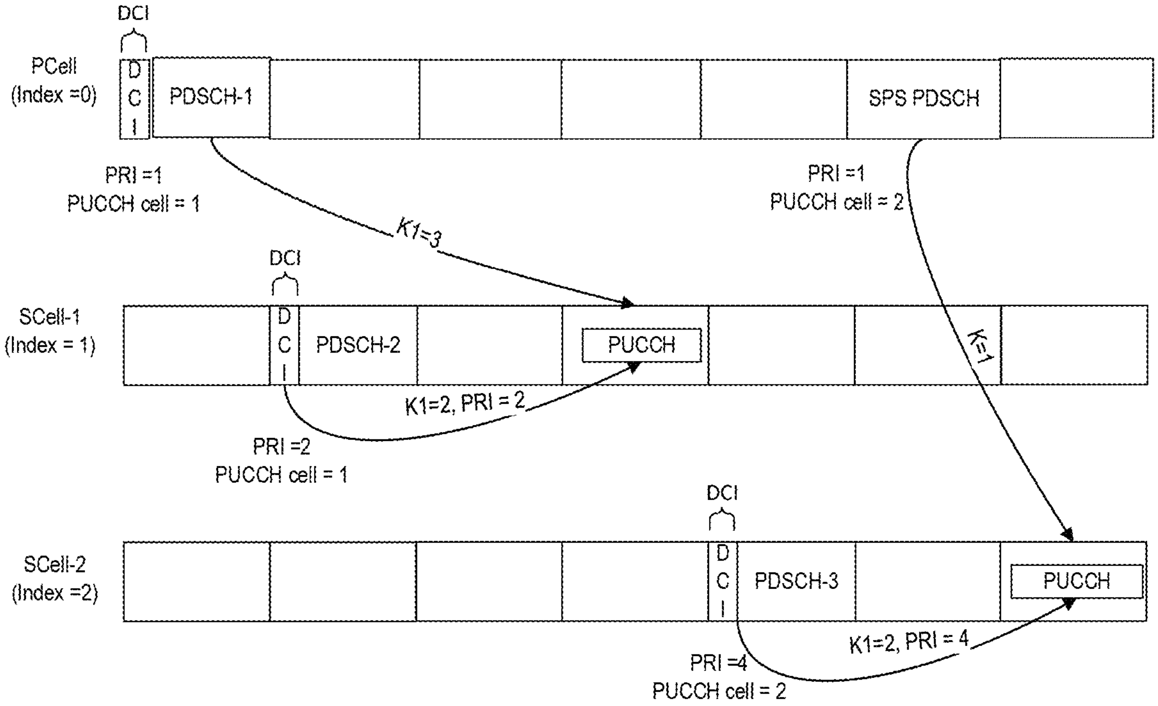
FIG. 10 illustrates a schematic view showing an example where DCI for PDSCH-1 and DCI for PDSCH-2 are located in different PUCCH cells.

With reference to FIG. 10, for PUCCH cell/carrier switching based on a dynamic indication in DCI, selection of PUCCH resource(s) is based on at least one of the following rules.

The PUCCH resource for HARQ-ACK transmission is indicated by gNB according to a PUCCH resource indication (PRI) associated with a PUCCH resource configured for the dynamically indicated target PUCCH cell/carrier.

When receiving from the gNB multiple DCIs indicating the same target cell/carrier for multiplexed HARQ-ACK transmission responding to scheduled PDSCHs, the UE uses a PRI of the last received DCI among the multiple DCIs in the time domain to determine the PUCCH resource for HARQ-ACK transmission on the target cell/carrier, which is indicated by the PRI of the last received DCI.

With reference to FIG. 10, in an example where PDSCH-1 is located in PCell, and PDSCH-2 is located in SCell-1, DCI for PDSCH-1 and DCI for PDSCH-2 indicate the same target cell, i.e., SCell-1, for PUCCH transmission. As an example, the later received DCI of PDSCH-2 determines the PUCCH resource, i.e., PRI=2, for HARQ-ACK transmission.

The PRI dynamically indicated in DCI that dynamically schedules a PDSCH and also dynamically indicates the target PUCCH cell/carrier for the PDSCH can overwrite the PRI configured by RRC signaling for an SPS PDSCH while the UE multiplexes HARQ-ACK of the SPS PDSCH and HARQ-ACK of the dynamically scheduled PDSCH to the dynamically indicated target PUCCH cell/carrier on the same slot.

With reference to FIG. 10, in an example where PUCCH cell/carrier for HARQ-ACK transmission of SPS PDSCH according to a semi-static time pattern is the same as the PUCCH cell/carrier indicated in the DCI of PDSCH-3 on the same slot. The PRI for multiplexed HARQ-ACK transmission on the target cell is determined by a PRI in the DCI of PDSCH-3.

With reference to FIG. 2 and according to embodiment B5, the UE further receives a second PDSCH and corresponding second DCI at a slot/sub-slot location n-K1' where K1'<K1, the UE determines the same slot/sub-slot location n for HARQ-ACK transmission responding to the received second PDSCH based on the HARQ feedback timing offset K1' indicated in the second DCI, a PUCCH resource used for the Type 1 HARQ-ACK codebook transmission is indicated in a PUCCH resource indication (PRI) of the second DCI.

With reference to FIG. 2 and according to embodiment A6, A8, A18, and B5, at least one PUCCH resource for transmission of the PUCCH at the slot/sub-slot location n is configured for the at least one second type cell/carrier supporting PUCCH cell/carrier switching, and the at least one PUCCH resource used for transmission of the PUCCH is indicated by a PRI in the first DCI with respect to the at least one second type cell/carrier indicated in the first PUCCH cell/carrier indication.

Embodiment B6: (SPS PUCCH Resource Indication)

If the UE only has HARQ-ACKs for SPS PDSCH without corresponding DCI to be transmitted on the target PUCCH cell/carrier, the PUCCH resource for transmission of the HARQ-ACKs on the target PUCCH cell/carrier can be determined based on RRC configuration. Transmission of HARQ-ACKs for SPS PDSCH is referred to as SPS HARQ-ACKs transmission.

The PUCCH resource selected for SPS HARQ-ACKs transmission is configured in RRC signaling (e.g., sps-PUCCH-AN-List-r16 or n1PUCCH-AN) of the corresponding target PUCCH cell/carrier.

The PUCCH resource used for SPS HARQ-ACK transmission should be configured for each of the PUCCH cells/carriers applicable for PUCCH cell/carrier switching within a PUCCH group.

The PUCCH resource for SPS HARQ-ACK transmission for PUCCH cells/carriers can be jointly configured (i.e., using unified configuration) or individually configured within a PUCCH group.

For SPS HARQ-ACK transmission, the PUCCH resource configured for PUCCH cell/carrier supporting PUCCH cell/carrier switching can be separated from the PUCCH resource configured for PUCCH cell/carrier without supporting PUCCH cell/carrier switching.

With reference to FIG. 2 and according to embodiment B6, if the at least one second type cell/carrier comprises more than one second type cell/carrier configured for PUCCH cell/carrier switching within a PUCCH group, the at least one PUCCH resource is jointly configured for the more than one second type cell/carrier within the PUCCH group.

With reference to FIG. 3, according to embodiments B6, the at least one of PUCCH resource is configured for transmission of HARQ ACK/NACK of a semi-persistent scheduling (SPS) PDSCH.

The at least one second type cell/carrier comprises more than one second type cell/carrier configured for PUCCH cell/carrier switching within a PUCCH group, and the at least one PUCCH resource is jointly configured for the more than one second type cell/carrier.

Embodiment B7

For a UE capable of performing PUCCH cell/carrier switching based on a dynamic indication in DCI, activation or deactivation of PUCCH cell/carrier switching between PUCCH cells/carriers within a PUCCH cell/carrier group can rely on one of the following schemes.

- Scheme 1: An enabler for performing PUCCH cell/carrier switching is configured in a configuration transmitted through an RRC signaling from the gNB to the UE, and the function of PUCCH cell/carrier switching can be enabled or disabled based on the configuration.
  - In an embodiment, an enabler of semi-static PUCCH cell/carrier switching and an enabler of dynamic PUCCH cell/carrier switching can be configured separately.
- Scheme 2: If PUCCH cell/carrier switching to a PUCCH cell/carrier other than PCell/PSCell/PUCCH-SCell is deactivated, a field of PUCCH cell/carrier indication in DCI can instruct UE to switch back to a PCell/PSCell/PUCCH-SCell.
- Scheme 3: A special combination of bit(s) in a field of DCI can indicate at least one of the following:
  - Activation or deactivation of PUCCH switching function based on dynamic DCI indication
  - Activation or deactivation of PUCCH switching function based on semi-static timing switching pattern.
  - Activation or deactivation of PUCCH switching function based on an index of a PUCCH group (referred to as a PUCCH group index).
  - Reset the PUCCH target cell/carrier to PCell/PSCell/PUCCH-SCell.
- Scheme 4: A timer-based PUCCH cell/carrier switching in response to a timer can be configured by the gNB, where the PUCCH cell/carrier switches back to PCell/PSCell/PUCCH-SCell when the timer is expired.
  - For example, a UE starts an inactivity timer when a PUCCH cell/carrier other than the PCell/PSCell/PUCCH-SCell is activated based on semi-static or dynamic PUCCH cell/carrier switching. The UE switches back to PCell/PSCell/PUCCH-SCell when the inactivity timer is expired.

With reference to FIG. 2 and according to embodiment B7, if the second DCI comprises a second PUCCH cell/carrier indication, then the HARQ feedback timing offset K1' is determined based on numerology of the determined cell/carrier indicated in the second PUCCH cell/carrier indication, and the K1 set used for constructing the Type 1 HARQ-ACK codebook is associated with the determined cell/carrier indicated in the second PUCCH cell/carrier indication.

With reference to FIG. 13, according to embodiment B7, the base station further transmits a DCI in a PDCCH, wherein the PUCCH cell/carrier type information is carried in the DCI, wherein the DCI comprises a PUCCH cell/carrier type indication to indicate the first type cell/carrier or the second type cell/carrier for transmitting the PUCCH at slot/sub-slot location n+K1_adj. The base station determines PUCCH cell/carrier for PUCCH reception at slot/sub-slot location n+K1_adj based on the cell/carrier type indication. The UE further receives a DCI in a PDCCH, wherein the PUCCH cell/carrier type information is carried in the DCI, wherein the DCI comprises a PUCCH cell/carrier type indication to indicate the first type cell/carrier or the second type cell/carrier for transmitting the PUCCH at slot/sub-slot location n+K1_adj. The UE determines PUCCH cell/carrier for PUCCH transmission at slot/sub-slot location n+K1_adj based on the cell/carrier type indication.

Embodiment B8

In case a UE has been indicated a PUCCH target cell/carrier for PUCCH transmission on a slot/sub-slot determined by a PDSCH to HARQ-ACK offset k1 based on a dynamic indication in DCI or semi-static PUCCH cell/carrier switching, the UE does not perform PUCCH cell/carrier switching or falls back to an original carrier, e.g., PCell/PSCell/PUCCH-SCell, on the slot/sub-slot for HARQ-ACK transmission in one or more conditions in the following:

- An uplink (UL) bandwidth part (BWP) of the indicated PUCCH target cell/carrier for PUCCH cell/carrier switching in a corresponding PUCCH cell/carrier group is not configured or is not activated.
- The indicated PUCCH target cell/carrier supporting PUCCH cell/carrier switching in a PUCCH group is not configured or activated or a PUCCH group supporting PUCCH cell/carrier switching is not configured or activated.
- The slot/sub-slot for HARQ-ACK transmission on the indicated PUCCH target cell/carrier is not a UL slot/sub-slot. For example, the semi-static SFI configuration or dynamic SFI indication in DCI indicates that the slot/sub-slot for PUCCH cell/carrier switching is a DL slot/sub-slot.

With reference to FIG. 2, according to embodiments A10 and B8, the UE determines to transmit the PUCCH on the at least one second type cell/carrier at the slot/sub-slot location n if the first PUCCH cell/carrier indication indicates transmission of the PUCCH on the at least one second type cell/carrier, and the following conditions in the received PUCCH-related configuration information are satisfied:

- in addition to the first type cell/carrier, at least one second type cell/carrier supporting PUCCH cell/carrier switching within a PUCCH group comprising the first cell/carrier is activated; and
- an uplink (UL) bandwidth part (BWP) of the at least one second type cell/carrier supporting PUCCH cell/carrier switching within the PUCCH group is activated.

With reference to FIG. 2 and according to embodiments B7 and B8, the UE determines to transmit PUCCH on the first type cell/carrier if the first PUCCH cell/carrier indication indicates the transmission of the PUCCH on the first type cell/carrier at slot/sub-slot location or if at least one of the following conditions in the received PUCCH-related configuration information is satisfied:

in addition to the first type cell/carrier, at least one second type cell/carrier supporting PUCCH cell/carrier switching within a PUCCH group is not activated, and a UL BWP of the at least one second type cell/carrier supporting PUCCH cell/carrier switching within the PUCCH group is not activated.

With reference to FIG. 2 and according to embodiment A16 and B8, conditions in the received PUCCH-related configuration information further comprise an additional condition, and the additional condition is that the at least one PUCCH resource for transmission of the PUCCH at slot/sub-slot location n of the at least one second type cell/carrier indicated in the first PUCCH cell/carrier indication is not collided with one or more non-UL symbols.

With reference to FIG. 3, according to embodiments A4, A10 and B8, the UE determines to transmit the PUCCH on the at least one second type cell/carrier if following conditions in the received PUCCH-related configuration information are satisfied:

in addition to the first type cell/carrier, at least one second type cell/carrier supporting PUCCH cell/carrier switching within a PUCCH group comprising the first cell/carrier is activated;

an uplink (UL) bandwidth part (BWP) of the at least one second type cell/carrier supporting PUCCH cell/carrier switching within the PUCCH group is activated;

at least a set of switching sequence indicating an order of PUCCH cell/carrier switching among the first type cell/carrier and the at least one second type cell/carrier at slot/sub-slot granularity within the PUCCH group for one or more than one slot/sub-slot is configured; and a numerical indication of a cell/carrier for transmission of the PUCCH on the slot/sub-slot location n is other than zero.

With reference to FIG. 14, according to embodiment B8, the bit indication is zero if the determined cell/carrier for transmitting by the UE 10 the PUCCH at slot/sub-slot location n is the first type cell/carrier.

The bit indication is zero if the determined cell/carrier for receiving by the gNB 20 the PUCCH at slot/sub-slot location n is the first type cell/carrier.

With reference to FIG. 14, according to embodiment B8, the PUCCH cell/carrier indication comprises a bit indication, and the bit indication is zero if the determined cell/carrier for transmitting the PUCCH at slot/sub-slot location n is the first type cell/carrier.

Embodiment B9: RRC Configuration of Dynamic PUCCH Cell/Carrier Switching or Semi-Static PUCCH Cell/Carrier Switching in a PUCCH Cell/Carrier Group one or both of dynamic PUCCH cell/carrier switching and semi-static PUCCH cell/carrier switching can be activated and configured per PUCCH group. For example, the PUCCH cells/carriers supporting PUCCH cell/carrier switching within a PUCCH group can be indicated in terms of serving cell index configured in a specific PUCCH group via an RRC parameter CellGroupConfig.

For a UE, the gNB can configure more than one set of time patterns for semi-static PUCCH cell/carrier switching with the same pattern periodicity or different pattern periodicities.

The periodicity of a time pattern in the set of time patterns can be a value of an integer multiple or an integer factor of a periodicity of time-division duplex (TDD) DL/UL configuration configured by gNB.

The granularity of a time pattern in the set of time patterns can be a value of an integer multiple or an integer factor of the periodicity of DL/UL configuration.

Scaling of the periodicity or granularity of a time pattern in the set of time patterns may be with respect to the numerology of a reference cell/carrier, e.g., PCell/PSCell/PUCCH-SCell.

The UE can select or be configured with one of the time patterns based on the periodicity of a DL/UL configuration for the reference cell/carrier, e.g., PCell/PSCell/PUCCH-SCell, or based on an DCI indication if a time pattern for semi-static PUCCH cell/carrier switching is applicable for HARQ-ACK transmission of dynamically scheduled PDSCH.

For a UE, the gNB can configure more than one PUCCH group for PUCCH cell/carrier switching.

One or more than one set of time patterns for semi-static PUCCH cell/carrier switching can be associated with one PUCCH group.

Different time patterns for semi-static PUCCH cell/carrier switching can be associated with different PUCCH groups With reference to FIG. 2 and according to embodiments A4 and B9, the at least one second type cell/carrier supporting PUCCH cell/carrier switching is activated via adding the at least one second type cell/carrier to the PUCCH group in establishing of the PUCCH group or is activated based on an indication in terms of a serving cell/carrier index within a PUCCH group via a radio resource control (RRC) parameter after the establishing of the PUCCH group.

With reference to FIG. 3, according to embodiments A4 and B9, the at least one second type cell/carrier supporting PUCCH cell/carrier switching is activated via adding the at least one second type cell/carrier to the PUCCH group in establishing of the PUCCH group or is activated based on an indication in terms of a serving cell/carrier index within the PUCCH group via a radio resource control (RRC) parameter after the establishing of the PUCCH group.

With reference to FIG. 3, according to embodiments A10 and B9, the set of switching sequence is a periodically generated time pattern, a slot/sub-slot length for each numerical indication represented by a bit in the switching sequence and the periodicity length of the time pattern are determined based on numerology of the first type cell/carrier.

With reference to FIG. 3, according to embodiments B4 and B9, if a plurality of PUCCH groups supporting PUCCH cell/carrier switching are configured for the UE, the set of switching sequence for PUCCH cell/carrier switching of each PUCCH group is independently configured by the base station, and one of the PUCCH groups is configured by the base station for transmission of the PUCCH.

Embodiment B10

For dynamic PUCCH cell/carrier switching, in addition to dynamic PUCCH cell/carrier indication, one or more of the following indications can also be provided in DCI (e.g., the same DCI):

An indication of a priority level (referred to as a priority level indication) of scheduled PDSCH and the corresponding HARQ-ACK is transmitted in a HARQ-ACK codebook with same priority level on the indicated PUCCH cell/carrier.

The priority level indication indicates a physical layer priority of a HARQ-ACK codebook to be transmitted on the target cell/carrier.

In an embodiment, HARQ-ACKs responding to corresponding PDSCHs with the same priority can be transmitted in the same HARQ-ACK codebook.

An indication (referred to as a PUCCH cell/carrier switching mode indication) to a PUCCH cell/carrier switching mode (e.g., semi-static PUCCH switching or dynamic PUCCH switching).

An indication (referred to as a PUCCH cell/carrier group indication) to a PUCCH group if multiple PUCCH cell/carrier groups are configured for a UE.

With reference to FIG. 2 and according to embodiment B10, the first DCI comprises a field of a priority level indication to indicate a priority level of a HARQ-ACK codebook to be transmitted on the PUCCH of the determined cell/carrier indicated in the first PUCCH cell/carrier indication.

With reference to FIG. 2 and according to embodiment B10, a plurality of PUCCH groups supporting PUCCH cell/carrier switching are configured for the UE, and the first DCI comprises a field of PUCCH group indication to indicate to the UE one of the plurality of the PUCCH groups for transmission of the PUCCH.

Embodiment B11

Figure 11:
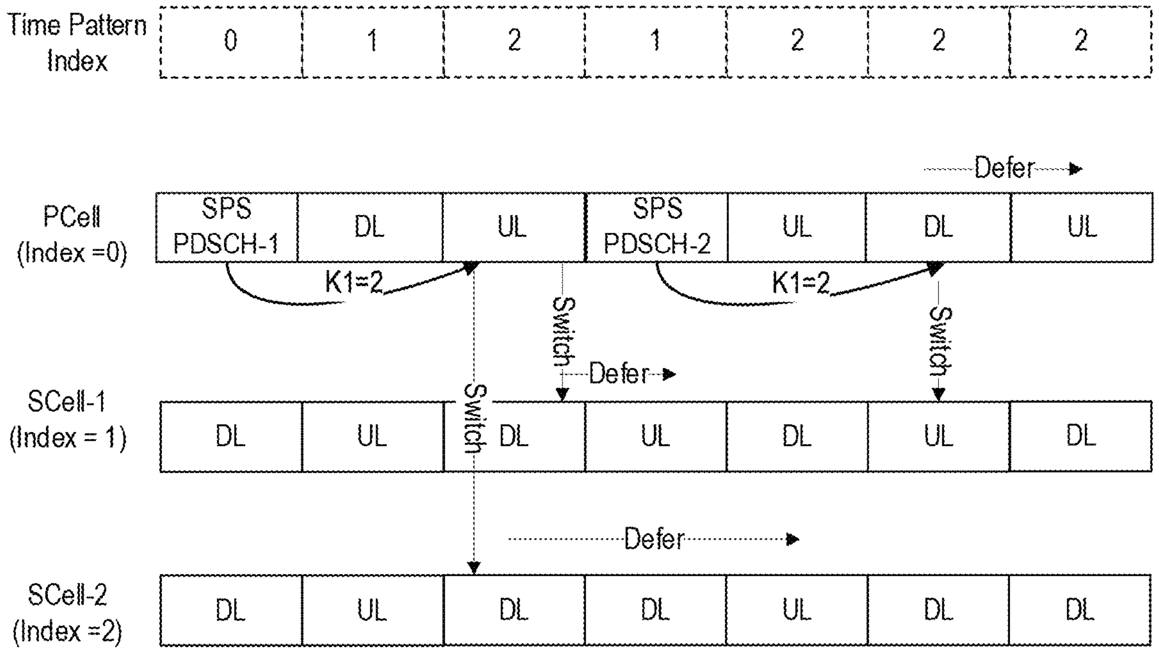
FIG. 11 illustrates a schematic view showing an example where a UE is configured with a time pattern for semi-static PUCCH cell/carrier switching as well as a function of SPS HARQ-ACK deferral.

In the embodiment, the UE has been configured with a time pattern for semi-static PUCCH cell/carrier switching as well as a function of SPS HARQ-ACK deferral. With reference to FIG. 11, when the PUCCH resource for HARQ-ACK transmission on the target PUCCH cell/carrier determined according to the time pattern at corresponding slot/sub-slot contains at least one invalid symbol e.g., non-UL symbol, the UE may perform one of the following operations:

The UE switches to the target PUCCH cell/carrier according to the time pattern and defers the SPS HARQ-ACK transmission (e.g., transmission of HARQ-ACK of SPS PDSCH-1) to the earliest slot/sub-slot with valid PUCCH resource on the same target PUCCH cell/carrier. (e.g., UL slot/sub-slot on SCell-2)

The UE switches to another target PUCCH cell/carrier having the earliest slot/sub-slot with valid PUCCH resource among PUCCH cells/carriers within a PUCCH group according to the time pattern applied to the slot/sub-slot. The UE defers the SPS HARQ-ACK transmission to the earliest slot/sub-slot on that target PUCCH cell/carrier. For example, the UE defers transmission of HARQ-ACK of SPS PDSCH-1 to a UL slot/sub-slot on SCell-1.

In selecting a target PUCCH cell/carrier for deferred transmission of HARQ-ACK, the UE prioritizes the original PUCCH over other PUCCH cells/carriers. That is, the UE determines to stay on the original PUCCH and perform deferred HARQ-ACK transmission on the original PUCCH rather than switching to the target PUCCH cell/carrier according to the time pattern for deferred HARQ-ACK transmission. For example, according to the prioritizing rule, when PCell is the original PUCCH of SPS PDSCH-2, the UE transmits HARQ-ACK of SPS PDSCH-2 on PCell.

The UE stays in the original PUCCH cell/carrier if the earliest slot/sub-slot with a valid PUCCH resource on the original PUCCH cell/carrier is earlier than the earliest slot/sub-slot with a valid PUCCH resource on the target PUCCH cell/carrier according to the time pattern. The UE defers the SPS HARQ-ACK transmission on the original PUCCH cell/carrier. For example, when PCell is the original PUCCH of SPS PDSCH-1, and the earliest slot/sub-slot with a valid PUCCH resource in PCell is earlier than the earliest slot/sub-slot with a valid PUCCH resource on the target PUCCH cell/carrier according to the time pattern, the UE performs deferred transmission of HARQ-ACK for SPS PDSCH-1 on PCell.

The UE switches to another target PUCCH cell/carrier if the earliest slot/sub-slot with a valid PUCCH resource on the another target PUCCH cell/carrier is earlier than the earliest slot/sub-slot with a valid PUCCH resource on the original PUCCH cell/carrier. The UE defers the SPS HARQ-ACK transmission on the another target PUCCH cell/carrier. For example, PCell is the original PUCCH of SPS PDSCH-2, and SCell-1 is the another target PUCCH cell/carrier. The earliest slot/sub-slot with a valid PUCCH resource on the another target PUCCH cell/carrier SCell-1 is earlier than the earliest slot/sub-slot with a valid PUCCH resource on the PCell, the UE performs deferred transmission of HARQ-ACK for SPS PDSCH-2 on SCell-1.

The UE determines the priority order for PUCCH cell/carrier switching and SPS HARQ-ACK deferral according to a configuration provided by a gNB when the target PUCCH cell/carrier determined according to the time pattern at corresponding slot/sub-slot contains at least one invalid symbol (such as gNB 20).

With reference to FIG. 13, according to the embodiment B11, the first type cell/carrier is one of primary cell (PCell), primary secondary cell (PSCell), or PUCCH-SCell in a PUCCH group, and the second type cell/carrier is one of secondary cells (SCells) within the same PUCCH group.

With reference to FIG. 13, according to embodiment B11, the PUCCH cell/carrier type information comprises a PUCCH cell/carrier switching time pattern for PUCCH cell/carrier switching within a PUCCH group. The UE determines the PUCCH cell/carrier for transmitting the PUCCH at the adjusted slot/sub-slot location n+K1_adj based on a bit indication associated with the adjusted slot/sub-slot location n+K1_adj in the PUCCH cell/carrier switching time pattern. The base station determines the PUCCH cell/carrier for receiving the PUCCH at the adjusted slot/sub-slot location n+K1_adj based on a bit indication associated with the adjusted slot/sub-slot location n+K1_adj in the PUCCH cell/carrier switching time pattern. With reference to FIG. 13, according to embodiment B11, the adjusted slot/sub-slot location n+K1_adj is the slot/sub-slot location determined by the UE as the earliest available slot/sub-slot location, wherein symbols within the slot/sub-slot location n+K1_adj associated with the determined PUCCH cell/carrier are valid for PUCCH transmission.

Figure 12:
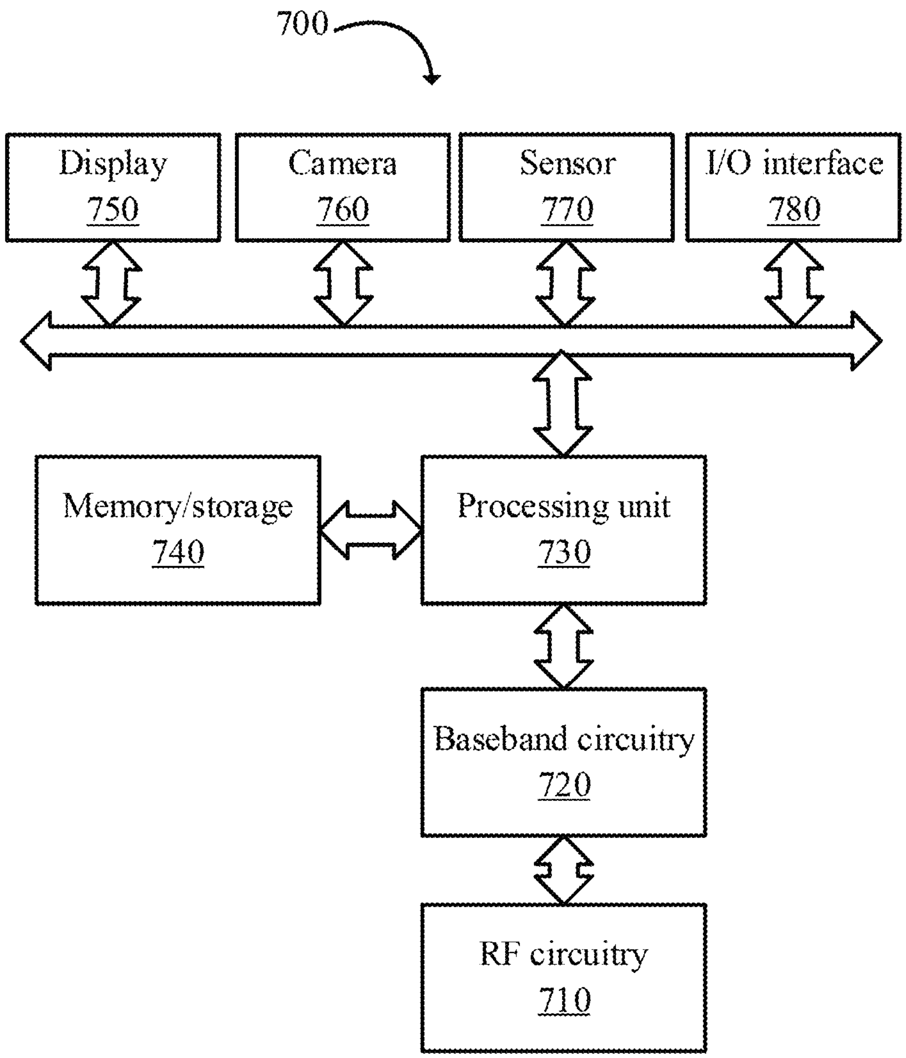
FIG. 12 illustrates a schematic view showing a system for wireless communication according to an embodiment of the present disclosure.

FIG. 12 is a block diagram of an example system 700 for wireless communication according to an embodiment of the present disclosure. Embodiments described herein may be implemented into the system using any suitably configured hardware and/or software. FIG. 12 illustrates the system 700 including a radio frequency (RF) circuitry 710, a baseband circuitry 720, a processing unit 730, a memory/storage 740, a display 750, a camera 760, a sensor 770, and an input/output (1/O) interface 780, coupled with each other as illustrated.

The processing unit 730 may include circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with 5G NR, LTE, an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the UE, eNB, or gNB may be embodied in whole or in part in one or more of the RF circuitries, the baseband circuitry, and/or the processing unit. As used herein, "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the processing unit, and/or the memory/storage may be implemented together on a system on a chip (SOC).

The memory/storage 740 may be used to load and store data and/or instructions, for example, for the system. The memory/storage for one embodiment may include any combination of suitable volatile memory, such as dynamic random access memory (DRAM)), and/or non-volatile memory, such as flash memory. In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite. In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, the system may have more or less components, and/or different architectures. Where appropriate, the methods described herein may be implemented as a computer program. The computer program may be stored on a storage medium, such as a non-transitory storage medium.

The embodiment of the present disclosure is a combination of techniques/processes that may be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of the application and design requirement for a technical plan. A person having ordinary skill in the art may use different ways to realize the function for each specific application while such realizations should not go beyond the scope of the present disclosure. It is understood by a person having ordinary skill in the art that he/she may refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure may be realized in other ways. The above-mentioned embodiments are exemplary only. The division of the units is merely based on logical functions while other divisions exist in realization. It is possible that a plurality of units or components are combined or integrated into another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments may be integrated into one processing unit, physically independent, or integrated into one processing unit with two or more than two units.

If the software function unit is realized and used and sold as a product, it may be stored in a readable storage medium in a computer. Based on this understanding, the technical plan proposed by the present disclosure may be essentially or partially realized as the form of a software product. Or, one part of the technical plan beneficial to the conventional technology may be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

Embodiments of the disclosure may be applied to HARQ-ACK feedback for URLLC or IIoT to reduce SPS PDSCH feedback latency and enhance HARQ-ACK transmission reliability.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

The invention claimed is:

1. A wireless communication method for execution by a user equipment (UE), comprising:

receiving physical uplink control channel (PUCCH) cell/carrier type information;

receiving a semi-persistent scheduling (SPS) physical downlink shared channel (PDSCH) at a downlink (DL) slot/sub-slot location n, wherein the SPS PDSCH is associated with a hybrid automatic repeat request (HARQ) feedback timing indicator K1 for indicating a transmission of a SPS HARQ-ACK bit responding to the received SPS PDSCH on a PUCCH at a HARQ-ACK feedback slot/sub-slot location n+K1;

determining an adjusted HARQ-ACK feedback slot/sub-slot location n+K1_adj;

determining, based on the received PUCCH cell/carrier type information, a first type cell/carrier or a second type cell/carrier as a determined PUCCH cell/carrier for PUCCH transmission at the adjusted slot/sub-slot location n+K1_adj; and transmitting the PUCCH on the determined PUCCH cell/carrier at the adjusted slot/sub-slot location n+K1_adj.

2. The wireless communication method of claim 1, wherein the first type cell/carrier is one of primary cell (PCell), primary secondary cell (PSCell), or PUCCH-SCell in a PUCCH group, and the second type cell/carrier is one of at least one secondary cell (SCell) within the same PUCCH group.

3. The wireless communication method of claim 2, wherein the UE further receives a downlink control information (DCI) in a physical downlink control channel (PDCCH), wherein the DCI comprises a HARQ-ACK feedback adjusting indicator to indicate the adjusted HARQ-ACK feedback slot/sub-slot location of the SPS HARQ-ACK bit responding to the received SPS PDSCH, and the UE adjusts the HARQ-ACK feedback slot/sub-slot location to the adjusted slot/sub-slot location n+K1 adj according to the HARQ-ACK feedback adjusting indicator.

4. The wireless communication method of claim 2, wherein the UE further receives a DCI in a PDCCH, wherein the PUCCH cell/carrier type information is carried in the DCI, wherein the DCI comprises a PUCCH cell/carrier type indication to indicate the first type cell/carrier or the second type cell/carrier for transmitting the PUCCH at the slot/sub-slot location n+K1 adj; and the UE determines the PUCCH cell/carrier for PUCCH transmission at the adjusted slot/sub-slot location n+K1_adj according to the cell/carrier type indication.

5. The wireless communication method of claim 2, wherein the PUCCH cell/carrier type information comprises a PUCCH cell/carrier switching time pattern for PUCCH cell/carrier switching within a PUCCH group; and the UE determines the PUCCH cell/carrier for transmitting the PUCCH at the adjusted slot/sub-slot location n+K1 adj according to a bit indication associated with the adjusted slot/sub-slot location n+K1 adj in the PUCCH cell/carrier switching time pattern.

6. The wireless communication method of claim 5, wherein the adjusted slot/sub-slot location n+K1 adj is the slot/sub-slot location determined by the UE as the earliest available slot/sub-slot location, wherein one or more symbols within the slot/sub-slot location n+K1 adj associated with the determined PUCCH cell/carrier are valid for PUCCH transmission.

7. The wireless communication method of claim 6, wherein the adjusted HARQ-ACK feedback value K1_adj comprises an offset K1_offset value with respect to K1, and the adjusted slot/sub-slot location n+K1 adj is a slot/sub-slot location n+K1+K1_offset, wherein at least one of the K1_adj or K1_offset is limited by a maximum offset value, and the maximum offset value is configured via radio resource control (RRC) signaling.

8. The wireless communication method of claim 6, wherein the valid one or more symbols in the adjusted slot/sub-slot location n+K1_adj for transmission of the PUCCH do not collide with semi-static DL symbols, synchronization signal block (SSB), or control-resource set zero (CORESET #0).

9. The wireless communication method of claim 6, wherein at least one of the symbols in the slot/sub-slot location n+K1 collides with semi-static DL symbols, SSB, or CORESET #0.

10. The wireless communication method of claim 6, wherein the adjusted slot/sub-slot location n+K1_adj is determined based on numerology of the first type cell/carrier.

11. The wireless communication method of claim 10, wherein at the slot/sub-slot location n+K1_adj, when a PUCCH slot/sub-slot length of the determined PUCCH cell/carrier is shorter than a slot/sub-slot length of the first type cell/carrier, the UE selects the first slot/sub-slot of the determined PUCCH cell/carrier overlapping with the slot/sub-slot location n+K1_adj for transmission of the PUCCH.

12. The wireless communication method of claim 5, wherein the UE constructs a Type 1 HARQ-ACK codebook, the Type 1 HARQ-ACK codebook comprises the SPS HARQ-ACK bit for transmission on the PUCCH at the slot/sub-slot location n+K1_adj, a K1 set used for constructing the Type 1 HARQ-ACK codebook is associated with the first type cell/carrier.

13. The wireless communication method of claim 5, wherein the UE further receives a downlink control information (DCI) in a physical downlink control channel (PDCCH), wherein the DCI comprises a HARQ-ACK feedback adjusting indicator to indicate the adjusted HARQ-ACK feedback slot/sub-slot location of the SPS HARQ-ACK bit responding to the received SPS PDSCH, and the UE adjusts the HARQ-ACK feedback slot/sub-slot location to the adjusted slot/sub-slot location n+K1_adj according to the HARQ-ACK feedback adjusting indicator.

14. The wireless communication method of claim 5, wherein the value of K1_adj is greater than K1, wherein n+K1 adj is determined based on numerology of the first type cell/carrier.

15. The wireless communication method of claim 5, wherein the bit indication is zero when the PUCCH cell/carrier for transmitting the PUCCH at slot/sub-slot location n+K1 adj is the first type cell/carrier.

16. A wireless communication method for execution by a base station, comprising:

transmitting physical uplink control channel (PUCCH) cell/carrier type information;

transmitting a semi-persistent scheduling (SPS) physical downlink shared channel (PDSCH) at a downlink (DL) slot/sub-slot location n, wherein the SPS PDSCH is associated with a hybrid automatic repeat request (HARQ) feedback timing indicator K1 for indicating a transmission of an SPS HARQ-ACK bit responding to the SPS PDSCH on a PUCCH at a HARQ-ACK feedback slot/sub-slot location n+K1;

determining an adjusted HARQ-ACK feedback slot/sub-slot location n+K1_adj;

determining, corresponding to the pucch cell/carrier type information, a first type cell/carrier or a second type cell/carrier as a determined PUCCH cell/carrier for PUCCH reception at the adjusted slot/sub-slot location n+K1_adj; and receiving the PUCCH on the determined PUCCH cell/carrier at the adjusted slot/sub-slot location n+K1_adj.

17. The wireless communication method of claim 16, wherein the first type cell/carrier is one of primary cell (PCell), primary secondary cell (PSCell), or PUCCH-SCell in a PUCCH group, and the second type cell/carrier is one of at least one secondary cell (SCell) within the same PUCCH group.

18. The wireless communication method of claim 17, wherein the base station further transmits a downlink control information (DCI) in a physical downlink control channel (PDCCH), wherein the PUCCH cell/carrier type information is carried in the DCI, wherein the DCI comprises a PUCCH cell/carrier type indication to indicate the first type cell/carrier or the second type cell/carrier for transmitting the PUCCH at the slot/sub-slot location n+K1_adj; and the base station determines the PUCCH cell/carrier for PUCCH reception at the slot/sub-slot location n+K1_adj corresponding to the cell/carrier type indication.

19. The wireless communication method of claim 17, wherein the PUCCH cell/carrier type information comprises a PUCCH cell/carrier switching time pattern for PUCCH cell/carrier switching within a PUCCH group; and the base station determines the PUCCH cell/carrier for receiving the PUCCH at the adjusted slot/sub-slot location n+K1_adj corresponding to a bit indication associated with the adjusted slot/sub-slot location n+K1 adj in the PUCCH cell/carrier switching time pattern.

20. The wireless communication method of claim 17, wherein the base station further transmits a downlink control information (DCI) in a physical downlink control channel (PDCCH), wherein the DCI comprises a HARQ-ACK feedback adjusting indicator to indicate the adjusted HARQ-ACK feedback slot/sub-slot location of the SPS HARQ-ACK bit responding to the transmitted SPS PDSCH, and the adjusted slot/sub-slot location n+K1 adj is determined according to the HARQ-ACK feedback adjusting indicator.

* * * * *